(12) United States Patent
Kulkarni et al.

(10) Patent No.: US 12,332,362 B2
(45) Date of Patent: Jun. 17, 2025

(54) SYSTEMS AND METHODS FOR RADIO FREQUENCY (RF) RANGING-AIDED LOCALIZATION AND MAP GENERATION

(71) Applicant: QUALCOMM Incorporated, San Diego, CA (US)

(72) Inventors: Mandar Narsinh Kulkarni, South Plainfield, NJ (US); Jubin Jose, Basking Ridge, NJ (US); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 17/819,191

(22) Filed: Aug. 11, 2022

(65) Prior Publication Data

US 2023/0213664 A1      Jul. 6, 2023

Related U.S. Application Data

(60) Provisional application No. 63/266,346, filed on Jan. 3, 2022.

(51) Int. Cl.
*G01S 19/46* (2010.01)
*G01C 21/28* (2006.01)
(Continued)

(52) U.S. Cl.
CPC .............. *G01S 19/46* (2013.01); *G01C 21/28* (2013.01); *G01S 13/865* (2013.01);
(Continued)

(58) Field of Classification Search
CPC ...... G01S 19/46; G01S 13/865; G01S 13/867; G01S 13/89; G01S 19/14; G01S 13/931;
(Continued)

(56) References Cited

U.S. PATENT DOCUMENTS

2017/0248963 A1   8/2017   Levinson et al.
2017/0307746 A1   10/2017  Rohani et al.
(Continued)

FOREIGN PATENT DOCUMENTS

EP   3629059 A1   4/2020
EP   3748291 A1   12/2020
WO   2021232160 A1   11/2021

OTHER PUBLICATIONS

International Search Report and Written Opinion—PCT/US2022/048370—ISA/EPO—Jan. 25, 2023.
(Continued)

*Primary Examiner* — Olumide Ajibade Akonai
(74) *Attorney, Agent, or Firm* — Haynes and Boone, LLP/Qualcomm

(57) ABSTRACT

Systems, methods, and devices for radio frequency (RF) ranging-aided localization and crowdsourced mapping are provided. In one aspect, a method performed by a user equipment (UE) includes obtaining sensor data comprising first radio frequency (RF) ranging data and imaging data. The method further includes tagging the first RF ranging data with location information and semantic information, wherein the semantic information is based on the imaging data, and wherein the semantic information indicates a first portion of the RF ranging data is associated with a static object type and a second portion of the RF ranging data is associated with a temporary-static object type different from the static object type. The method further includes transmitting, to a RF ranging assistance server, the first RF ranging data tagged with the location information and the semantic information.

50 Claims, 14 Drawing Sheets

(51) Int. Cl.
*G01S 13/86* (2006.01)
*G01S 13/89* (2006.01)
*G01S 13/931* (2020.01)
*G01S 19/14* (2010.01)

(52) U.S. Cl.
CPC ............ *G01S 13/867* (2013.01); *G01S 13/89* (2013.01); *G01S 19/14* (2013.01); *G01S 13/931* (2013.01)

(58) Field of Classification Search
CPC .......... G01S 7/003; G01S 13/87; G01S 17/86; G01S 17/89; G01S 17/931; G01S 19/51; G01S 5/0284; G01S 17/06; G01S 7/415; G01C 21/28; G01C 21/34; G01C 21/3807; G01C 21/3841; G01C 21/3848; G01C 21/3889; G01C 21/3896; G05D 1/0246; G05D 2109/10; G06F 18/24; B60R 2300/301; G06V 20/41; G06V 40/172; G06T 2207/10028; H04W 4/02; H04W 4/029
See application file for complete search history.

(56) References Cited

U.S. PATENT DOCUMENTS

| | | |
|---|---|---|
| 2019/0391235 A1 | 12/2019 | Harrison |
| 2020/0326707 A1 | 10/2020 | Shashua et al. |
| 2022/0138589 A1* | 5/2022 | Jain .......................... G06N 5/01 706/12 |
| 2022/0196828 A1* | 6/2022 | Sorrentino .............. G01S 7/003 |
| 2023/0095624 A1* | 3/2023 | Ramanath ............ G05D 1/0248 |
| 2023/0169805 A1* | 6/2023 | Ramnani ................ G07C 5/008 701/29.3 |

OTHER PUBLICATIONS

Neuhold D., et al., "HiPR: High-Precision UWB Ranging for Sensor Networks", Modeling, Analysis and Simulation of Wireless and Mobile Systems, ACM, 2 Penn Plaza, Suite 701 Newyork NY 10121-0701 USA, Nov. 25, 2019, XP058448792, pp. 103-107.

* cited by examiner

SYSTEMS AND METHODS FOR RADIO FREQUENCY (RF) RANGING-AIDED LOCALIZATION AND MAP GENERATION

CROSS-REFERENCE TO RELATED APPLICATIONS

The present application claims the benefit of, and priority to, U.S. Provisional Patent Application No. 63/266,346, filed Jan. 3, 2022, the entirety of which is incorporated by reference herein as if fully set forth below and for all applicable purposes.

INTRODUCTION

Modern motor vehicles are increasingly incorporating technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver automated driving systems (ADS) that can handle the entire task of driving without the need for user intervention. Such technology, in most cases, includes radio frequency (RF) ranging-based detection of other vehicles, pedestrians, objects, etc. that are in the vicinity of the vehicle equipped with the technology.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In some aspects of the present disclosure, a method of generating a crowdsourced RF ranging map for RF ranging-aided localization is provided. For the purposes of the present disclosure, it will be understood that RF ranging may contemplate or include RF ranging and bearing techniques such that a relative distance (range) and relative bearing (angular position) may be determined based on a received RF beam's timing and angular/spatial characteristics, respectively. Accordingly, RF ranging as used in the present disclosure may include or involve obtaining 2-dimensional and/or 3-dimensional data by scanning RF signals across a scene or field of view. In one aspect, a method may include a user equipment (UE), such as an ego vehicle, obtaining RF ranging data and pose data. The RF ranging data may comprise at least a 2-dimensional or 3-dimensional point cloud of target locations relative to the ego vehicle and the pose data may comprise at least 2-dimensional or 3-dimensional orientation and translation information with respect to a fixed frame. The pose data may be determined using a global frame (e.g., earth-centered earth-fixed) or any other fixed frame. For example, the pose data may be obtained by satellite-based reference sensors (e.g., global positioning system (GPS), global navigation satellite system (GNSS)), light detection and ranging (LIDAR) sensors, camera sensors, and/or any other suitable sensor. The RF ranging data and pose data may be timestamped or otherwise temporally correlated such that the RF ranging data can be projected to a global reference frame. The ego vehicle may transmit one or more messages to a server indicating the RF ranging sensor data and the pose data. The transmission of the data may be based on a mapping flag state (ON/OFF). For example, if the local conditions are conducive to accurate pose data, the mapping flag state may be ON. In another aspect, if the server wishes to halt RF ranging mapping data from a geographical area, the server may wirelessly transmit or broadcast a message causing the mapping flag to be in an OFF state.

In some aspects, the one or more messages transmitted by the UE may include side information or semantic information for identifying static, temporary-static, and/or dynamic objects in a scene. For example, the semantic information may include doppler-based information indicating a probability that a target object is static or dynamic. The semantic information may be based on camera data, LIDAR data, and/or vehicle pose data in some aspects. Exemplary semantic information may be in the form of object classes, which may include dynamic, static, temporary-static, and/or sub-classes thereof. Dynamic objects may correspond to moving objects in a scene like moving cars, walking pedestrians, etc. Static objects may refer to permanent non-moving objects in the scene. Temporary-static objects may refer to stationary objects in the scene that are likely to move in the near future. For example, the UE may be configured to identify, based on RF ranging Doppler information, dynamic objects in the scene. Furthermore, the UE may be configured to identify, based on the camera data and/or LIDAR data, one or more temporary-static objects (e.g., parked cars, construction barricades) in a scene, and tag RF ranging data points as being dynamic or permanently static or temporary-static based on the identification. In some aspects, the server and/or ego vehicle may be configured to perform 2-dimensional or 3-dimensional triangulation of features detected from other sensors like camera to tag the RF ranging data points corresponding to a temporary-static objects.

The present disclosure also describes methods and apparatuses for performing RF ranging localization based on RF ranging data and a crowdsourced RF ranging map. In this regard, a UE may obtain (e.g., download), from a remote RF ranging assistance server via a wireless network entity, a RF ranging map generated based on RF ranging and pose data from one or more other ego vehicles. The UE may obtain coarse pose information (e.g., GPS data, global reference sensor data), and RF ranging data of its current location. The UE may also obtain relative pose data based on, for example, wheel odometer measurements, velocity measurements, compass data, etc. Based on the relative pose data and the RF ranging data, the UE may generate a local signature of the RF ranging data by aggregating the data over a short duration of time. The local signature may be in the form of a RF ranging map or a point cloud. The UE may then perform a matching algorithm based on the local signature and the global RF ranging map provided by the server to determine the location and heading of the UE.

According to one aspect of the present disclosure, a method performed by a user equipment (UE) includes: obtaining sensor data comprising first radio frequency (RF) ranging data and imaging data; tagging the first RF ranging data with location information and semantic information, wherein the semantic information is based on the imaging data, and wherein the semantic information indicates a first portion of the RF ranging data is associated with a static object type and a second portion of the RF ranging data is associated with a temporary-static object type different from the static object type; and transmitting, to a RF ranging assistance server, the first RF ranging data tagged with the location information and the semantic information.

According to one aspect of the present disclosure, a method performed by a UE includes: transmitting, to a radio frequency (RF) ranging assistance server, location information associated with a position of the UE; receiving, from a RF ranging assistance server based on the location information, location-tagged RF ranging assistance data based on first RF ranging data and first imaging data from a plurality of other UEs different from the UE, wherein the location-tagged RF ranging assistance data comprises semantic information indicating a first portion of the location-tagged RF ranging assistance data is associated with a static object type, and a second portion of the location-tagged RF ranging assistance data is associated with a temporary-static object type; obtaining second RF ranging data; and determining, based on the location information and the location-tagged RF ranging assistance data, whether a first portion of the second RF ranging data is associated with the static object type or the temporary-static object type.

According to one aspect of the present disclosure, a method performed by a RF ranging assistance server includes: receiving, from a plurality of user equipments (UEs), location-tagged RF ranging data; determining, based on the location-tagged RF ranging data, semantic information indicating a first portion of the RF ranging data is associated with a static object type and a second portion of the RF ranging data is associated with a temporary-static object type different from the static object type; and transmitting, to one or more of the plurality of UEs, RF ranging assistance data tagged with the semantic information.

According to another aspect, a UE includes: a memory device; a transceiver; and a processor in communication with the memory device, wherein the UE is configured to: obtain sensor data comprising first radio frequency (RF) ranging data and imaging data; tag the first RF ranging data with location information and semantic information, wherein the semantic information is based on the imaging data, and wherein the semantic information indicates a first portion of the RF ranging data is associated with a static object type and a second portion of the RF ranging data is associated with a temporary-static object type different from the static object type; and transmit, to a RF ranging assistance server, the first RF ranging data tagged with the location information and the semantic information.

According to another aspect, a UE includes: a memory device; a transceiver; and a processor in communication with the memory device, wherein the UE is configured to: transmit, to a radio frequency (RF) ranging assistance server, location information associated with a position of the UE; receive, from a RF ranging assistance server based on the location information, location-tagged RF ranging assistance data based on first RF ranging data and first imaging data from a plurality of other UEs different from the UE, wherein the location-tagged RF ranging assistance data comprises semantic information indicating a first portion of the location-tagged RF ranging assistance data is associated with a static object type, and a second portion of the location-tagged RF ranging assistance data is associated with a temporary-static object type; obtain second RF ranging data; and determine, based on the location information and the location-tagged RF ranging assistance data, whether a first portion of the second RF ranging data is associated with the static object type or the temporary-static object type.

According to another aspect, an apparatus includes: a memory device; a transceiver; and a processor in communication with the memory device, wherein the UE is configured to: receive, from a plurality of user equipments (UEs), location-tagged RF ranging data; determine, based on the location-tagged RF ranging data, semantic information indicating a first portion of the RF ranging data is associated with a static object type and a second portion of the RF ranging data is associated with a temporary-static object type different from the static object type; and transmit, to one or more of the plurality of UEs, RF ranging assistance data tagged with the semantic information.

According to another aspect, a non-transitory, computer-readable medium has program code recorded thereon, where the program code comprises instructions executable by a processor of a user equipment (UE) to cause the UE to: obtain sensor data comprising first radio frequency (RF) ranging data and imaging data; tag the first RF ranging data with location information and semantic information, wherein the semantic information is based on the imaging data, and wherein the semantic information indicates a first portion of the RF ranging data is associated with a static object type and a second portion of the RF ranging data is associated with a temporary-static object type different from the static object type; and transmit, to a RF ranging assistance server, the first RF ranging data tagged with the location information and the semantic information.

According to another aspect of the present disclosure, a non-transitory, computer-readable medium has program code recorded thereon, where the program code comprises instructions executable by a processor of a UE to cause the UE to: transmit, to a radio frequency (RF) ranging assistance server, location information associated with a position of the UE; receive, from a RF ranging assistance server based on the location information, location-tagged RF ranging assistance data based on first RF ranging data and first imaging data from a plurality of other UEs different from the UE, wherein the location-tagged RF ranging assistance data comprises semantic information indicating a first portion of the location-tagged RF ranging assistance data is associated with a static object type, and a second portion of the location-tagged RF ranging assistance data is associated with a temporary-static object type; obtain second RF ranging data; and determine, based on the location information and the location-tagged RF ranging assistance data, whether a first portion of the second RF ranging data is associated with the static object type or the temporary-static object type.

According to another aspect, a non-transitory, computer-readable medium has program code recorded thereon, where the program code comprises instructions executable by a processor of an apparatus to cause the apparatus to: receive, from a plurality of user equipments (UEs), location-tagged RF ranging data; determine, based on the location-tagged RF ranging data, semantic information indicating a first portion of the RF ranging data is associated with a static object type and a second portion of the RF ranging data is associated with a temporary-static object type different from the static object type; and transmit, to one or more of the plurality of UEs, RF ranging assistance data tagged with the semantic information.

According to another aspect, a UE includes: means for obtaining sensor data comprising first radio frequency (RF) ranging data and imaging data; means for tagging the first RF ranging data with location information and semantic information, wherein the semantic information is based on the imaging data, and wherein the semantic information indicates a first portion of the RF ranging data is associated with a static object type and a second portion of the RF ranging data is associated with a temporary-static object type different from the static object type; and means for transmitting, to a RF ranging assistance server, the first RF ranging data tagged with the location information and the semantic information.

According to another aspect, a UE includes: means for transmitting, to a radio frequency (RF) ranging assistance server, location information associated with a position of the UE; means for tagging, from a RF ranging assistance server based on the location information, location-tagged RF ranging assistance data based on first RF ranging data and first imaging data from a plurality of other UEs different from the UE, wherein the location-tagged RF ranging assistance data comprises semantic information indicating a first portion of the location-tagged RF ranging assistance data is associated with a static object type, and a second portion of the location-tagged RF ranging assistance data is associated with a temporary-static object type; means for obtaining second RF ranging data; and means for determining, based on the location information and the location-tagged RF ranging assistance data, whether a first portion of the second RF ranging data is associated with the static object type or the temporary-static object type.

According to another aspect, an apparatus includes: means for tagging, from a plurality of user equipments (UEs), location-tagged RF ranging data; means for determining, based on the location-tagged RF ranging data, semantic information indicating a first portion of the RF ranging data is associated with a static object type and a second portion of the RF ranging data is associated with a temporary-static object type different from the static object type; and means for transmitting, to one or more of the plurality of UEs, RF ranging assistance data tagged with the semantic information.

Other aspects, features, and embodiments of the present invention will become apparent to those of ordinary skill in the art, upon reviewing the following description of specific, exemplary embodiments of the present invention in conjunction with the accompanying figures While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

The accompanying drawings are presented to aid in the description of various aspects of the disclosure and are provided solely for illustration of the aspects and not limitation thereof

DETAILED DESCRIPTION

Figure 1A:
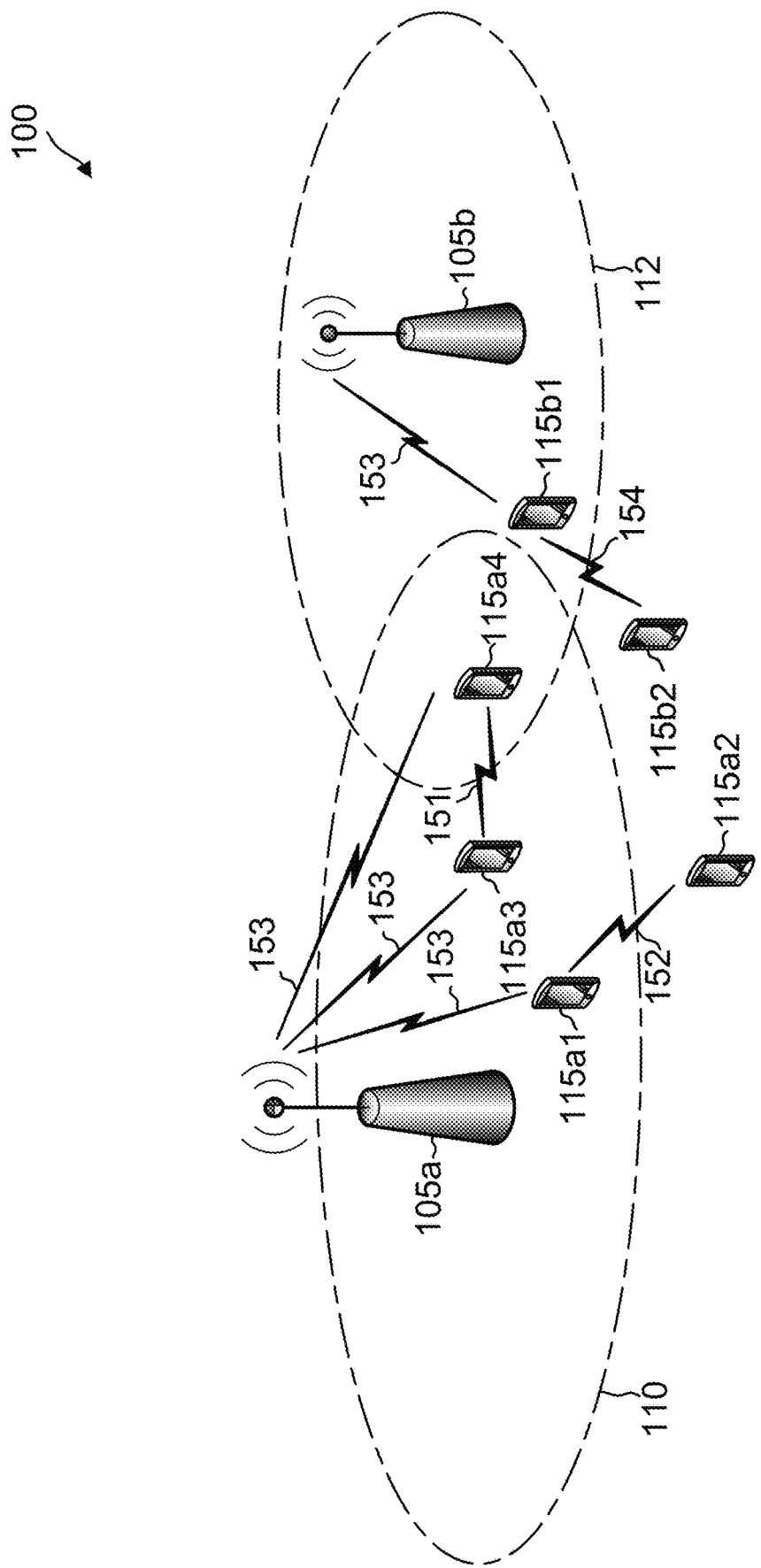
FIG. 1A shows an example schematic diagram of a RF ranging localization and mapping scheme, according to some aspects of the disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Autonomous vehicles may benefit from all-weather robust solutions for localization, wherein a vehicle knows its pose (position and orientation) with a suitable accuracy. In some aspects, it may be desirable to provide for pose accuracy within a few centimeters (cm). Similar to the human eye, LIDAR and camera imaging may be inhibited at night times or when there is too much fog, rain, snow, or dust in the surroundings. Global positioning sensors like GPS or GNSS may also be less reliable or unavailable underground, or in tunnel scenarios and challenged in urban canyon scenarios. It may be beneficial to utilize lower frequencies, for instance operating at millimeter wave (mmWave), for enabling localization in such challenging scenarios.

The present disclosure provides RF ranging-aided crowd-sourced mapping and localization methods, systems, and devices. In addition to being robust to changing weather, RF ranging may be relatively less expensive compared to LIDAR and/or camera imaging equipment. Another advantage compared to camera imaging is that RF ranging-aided solutions may provide for more privacy than using camera images alone. However, challenges in designing an accurate and scalable RF ranging-based solution present challenges that may be less prevalent with camera, LIDAR or GNSS sensors.

Compared to LIDAR, RF ranging localization is challenging in part due to sparser and inaccurate target detection or point cloud. The sparsity of the point cloud from RF ranging may be due to low angular resolution leading to few detected points in space per timeframe. In some aspects, RF ranging beamforming techniques may be subject to multipath in the environment or imperfect beam shapes, which can also lead to ghost targets, i.e., targets which are not present but show up as detected targets by the RF ranging. Further, reproducing the same target detection output every time a RF ranging sensor pings an object is difficult if the sensor pings from a slightly different position in space.

RF ranging-aided localization in a global coordinate frame may involve obtaining a reference map built apriori to compare to periodically compiled RF ranging signatures and locate or localize the position of the vehicle in the global frame. A local signature may include batched RF ranging scan data obtained over a period of time (e.g., 200 ms to 5 s). Each scan in the signature may be aligned based on vehicle pose, velocity, and/or heading information (e.g., odometer, wheel tick, compass data, etc.) Scan-to-scan matching, which may be possible for LIDAR-based localization, may not be feasible using RF ranging data due to challenges on accuracy and sparsity of the RF ranging point cloud. One approach to creating a global reference map for RF ranging localization may be deploying a dedicated fleet of vehicles equipped with RF ranging sensors, GPS/GNSS sensors, LIDAR sensors, and/or other ranging and localization equipment to generate and maintain RF ranging reference maps. However, such an approach may be highly cumbersome in dynamically changing environments. Another approach may be to employ a simultaneous localization and mapping (SLAM) approach by ego vehicles. However, SLAM systems may involve expensive equipment which may not be feasible for all vehicles. In some aspects maps generated using SLAM may limited by the quality of the sensor data installed on vehicle. Accordingly, the present disclosure provides methods, systems, and devices for crowdsourcing mapping data for RF ranging mapping and localization to generate RF ranging maps that can be used by vehicles with different sensor specifications.

The RF ranging-aided localization mechanisms and techniques described herein may involve one or more wireless communication schemes and/or networks, For example, a vehicle may be configured to communicate with other vehicles and/or with a server via a network using fourth-generation long-term evolution (LTE), fifth generation new radio (5G NR), sidelink communications, vehicle-to-vehicle (V2V), vehicle-to-everything (V2X), and/or any other suitable type of communication. In some aspects, V2V and/or V2X communications may include or involve sidelink (SL) communication methods and networks.

FIG. 1A illustrates an example of a wireless communication network 100 that provisions for sidelink communications according to aspects of the present disclosure. The network 100 may correspond to a portion of the network 100. FIG. 1A illustrates two BSs 105 (shown as 105a and 105b) and six UEs 115 (shown as 115a1, 115a2, 115a3, 115a4, 115b1, and 115b2) for purposes of simplicity of discussion, though it will be recognized that aspects of the present disclosure may scale to any suitable number of UEs 115 (e.g., the about 1, 3, 4, 5, 7 or more) and/or BSs 105 (e.g., the about 1, 3 or more). Although the sidelink UEs 115 are illustrated as mobile communication devices (e.g., smartphones), it will be understood that the UEs 115 may include any suitable type of sidelink communication device, including sidelink-enabled vehicles configured for V2V, V2X, and/or C-V2X communications.

The BS 105 and the UEs 115 may be similar to the BSs 105 and the UEs 115, respectively. In some aspects, the BS 105 may be referred to as a network entity or network device. The BSs 105 and the UEs 115 may share the same radio frequency band for communications. In some instances, the radio frequency band may be a 1.4 GHz unlicensed band, a 5 GHz unlicensed band, or a 6 GHz unlicensed band. In general, the shared radio frequency band may be at any suitable frequency.

The BS 105a and the UEs 115a1-215a4 may be operated by a first network operating entity. The BS 105b and the UEs 115b1-215b2 may be operated by a second network operating entity. In some aspects, the first network operating entity may utilize a same RAT as the second network operating entity. For instance, the BS 105a and the UEs 115a1-215a4 of the first network operating entity and the BS 105b and the UEs 115b1-215b2 of the second network operating entity are NR-U devices. In some other aspects, the first network operating entity may utilize a different RAT than the second network operating entity. For instance, the BS 105a and the UEs 115a1-215a4 of the first network operating entity may utilize NR-U technology while the BS 105b and the UEs 115b1-215b2 of the second network operating entity may utilize WiFi or LAA technology.

In the network 100, some of the UEs 115a1-215a4 may communicate with each other in peer-to-peer communications. For example, the UE 115a1 may communicate with the UE 115a2 over a sidelink 152, the UE 115a3 may communicate with the UE 115a4 over another sidelink 151, and the UE 115b1 may communicate with the UE 115b2 over yet another sidelink 154. The sidelinks 151, 152, and 154 are unicast bidirectional links. Some of the UEs 115 may also communicate with the BS 105a or the BS 105b in a UL direction and/or a DL direction via communication links 153. For instance, the UE 115a1, 115a3, and 115a4 are within a coverage area 110 of the BS 105a, and thus may be in communication with the BS 105a. The UE 115a2 is outside the coverage area 110, and thus may not be in direct communication with the BS 105a. In some instances, the UE 115a1 may operate as a relay for the UE 115a2 to reach the BS 105a. Similarly, the UE 115b1 is within a coverage area 112 of the BS 105b, and thus may be in communication with the BS 105b and may operate as a relay for the UE 115b2 to reach the BS 105b. In some aspects, some of the UEs 115 are associated with vehicles (e.g., similar to the UEs 115i-k) and the communications over the sidelinks 151, 152, and 154 may be C-V2X communications. C-V2X communications may refer to communications between vehicles and any other wireless communication devices in a cellular network.

Figure 1B:
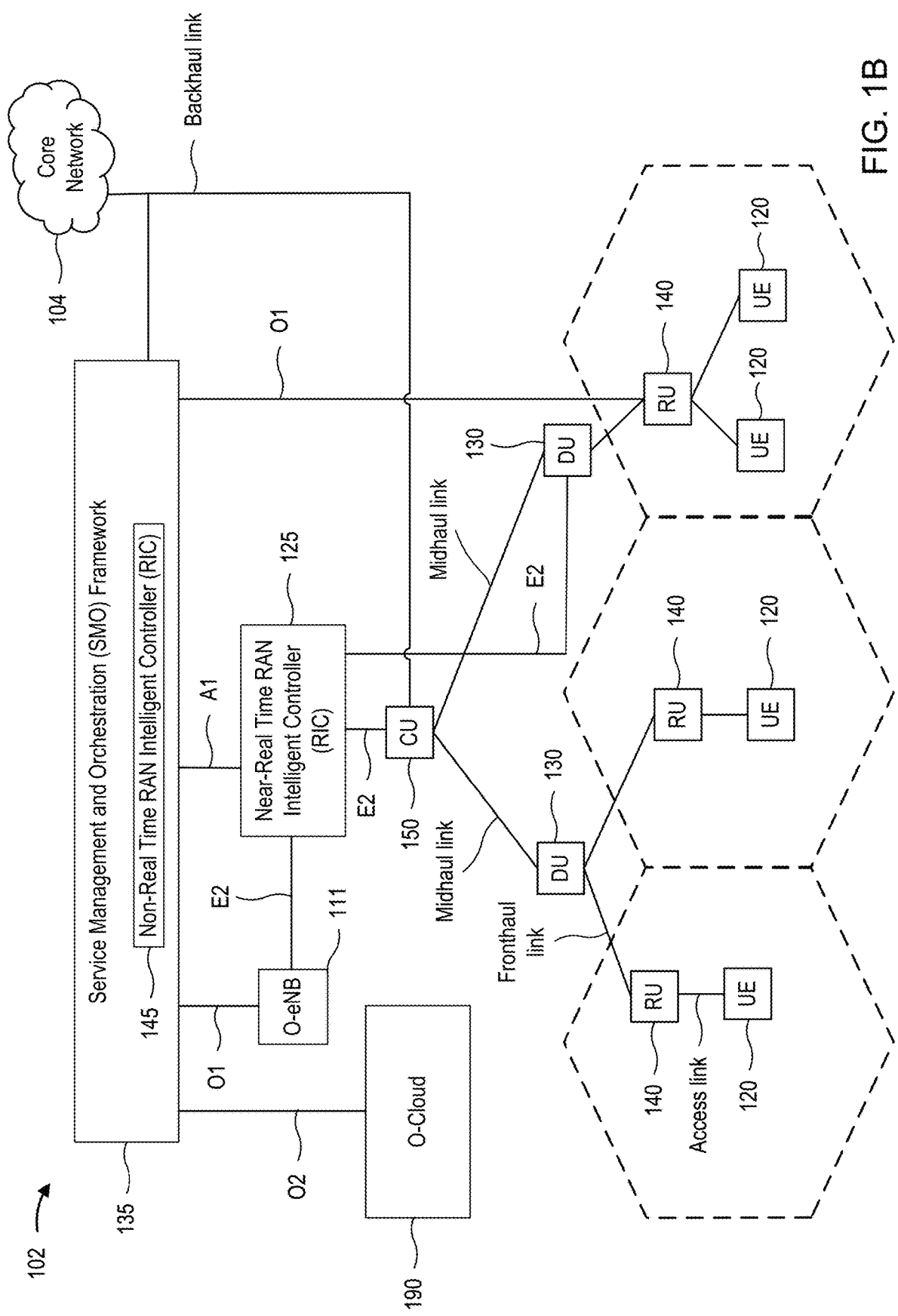
FIG. 1B is a diagram illustrating an example disaggregated BS architecture according to some aspects of the present disclosure.

FIG. 1B shows a diagram illustrating an example disaggregated base station 102 architecture. The disaggregated base station 102 architecture may include one or more central units (CUs) 150 that can communicate directly with a core network 104 via a backhaul link, or indirectly with the core network 104 through one or more disaggregated base station units (such as a Near-Real Time (Near-RT) RAN Intelligent Controller (MC) 125 via an E2 link, or a Non-Real Time (Non-RT) RIC 145 associated with a Service Management and Orchestration (SMO) Framework 135, or both). A CU 150 may communicate with one or more distributed units (DUs) 130 via respective midhaul links, such as an F1 interface. The DUs 130 may communicate with one or more radio units (RUs) 140 via respective fronthaul links. The RUs 140 may communicate with respective UEs 120 via one or more radio frequency (RF) access links. In some implementations, the UE 120 may be simultaneously served by multiple RUs 140.

Each of the units, i.e., the CUs 150, the DUs 130, the RUs 140, as well as the Near-RT RICs 125, the Non-RT RICs 145 and the SMO Framework 135, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 150 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 150. The CU 150 may be configured to handle user plane functionality (i.e., Central Unit-User Plane (CU-UP)), control plane functionality (i.e., Central Unit-Control Plane (CU-CP)), or a combination thereof. In some implementations, the CU 150 can be logically split into one or more CU-UP units and one or more CU-CP units. The CU-UP unit can communicate bidirectionally with the CU-CP unit via an interface, such as the E1 interface when implemented in an O-RAN configuration. The CU 150 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 130 may further host one or more low PHY layers. Each layer (or module) can be implemented with an interface configured to communicate signals with other layers (and modules) hosted by the DU 130, or with the control functions hosted by the CU 150.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs. In some implementations, real-time and non-real-time aspects of control and user plane communication with the RU(s) 140 can be controlled by the corresponding DU 130. In some scenarios, this configuration can enable the DU(s) 130 and the CU 150 to be implemented in a cloud-based RAN architecture, such as a vRAN architecture.

The SMO Framework 135 may be configured to support RAN deployment and provisioning of non-virtualized and virtualized network elements. For non-virtualized network elements, the SMO Framework 135 may be configured to support the deployment of dedicated physical resources for RAN coverage requirements which may be managed via an operations and maintenance interface (such as an O1 interface). For virtualized network elements, the SMO Framework 135 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 150, DUs 130, RUs 140 and Near-RT RICs 125. In some implementations, the SMO Framework 135 can communicate with a hardware aspect of a 4G RAN, such as an open eNB (O-eNB) 111, via an O1 interface. Additionally, in some implementations, the SMO Framework 135 can communicate directly with one or more RUs 140 via an O1 interface. The SMO Framework 135 also may include a Non-RT RIC 145 configured to support functionality of the SMO Framework 135.

The Non-RT RIC 145 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 125. The Non-RT RIC 145 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 150, one or more DUs 130, or both, as well as an O-eNB, with the Near-RT RIC 125.

In some implementations, to generate AI/ML models to be deployed in the Near-RT RIC 125, the Non-RT RIC 145 may receive parameters or external enrichment information from external servers. Such information may be utilized by the Near-RT RIC 125 and may be received at the SMO Framework 135 or the Non-RT RIC 145 from non-network data sources or from network functions. In some examples, the Non-RT RIC 145 or the Near-RT RIC 125 may be configured to tune RAN behavior or performance. For example, the Non-RT RIC 145 may monitor long-term trends and patterns for performance and employ AI/ML models to perform corrective actions through the SMO Framework 135 (such as reconfiguration via O1) or via creation of RAN management policies (such as AI policies).

Figure 2:
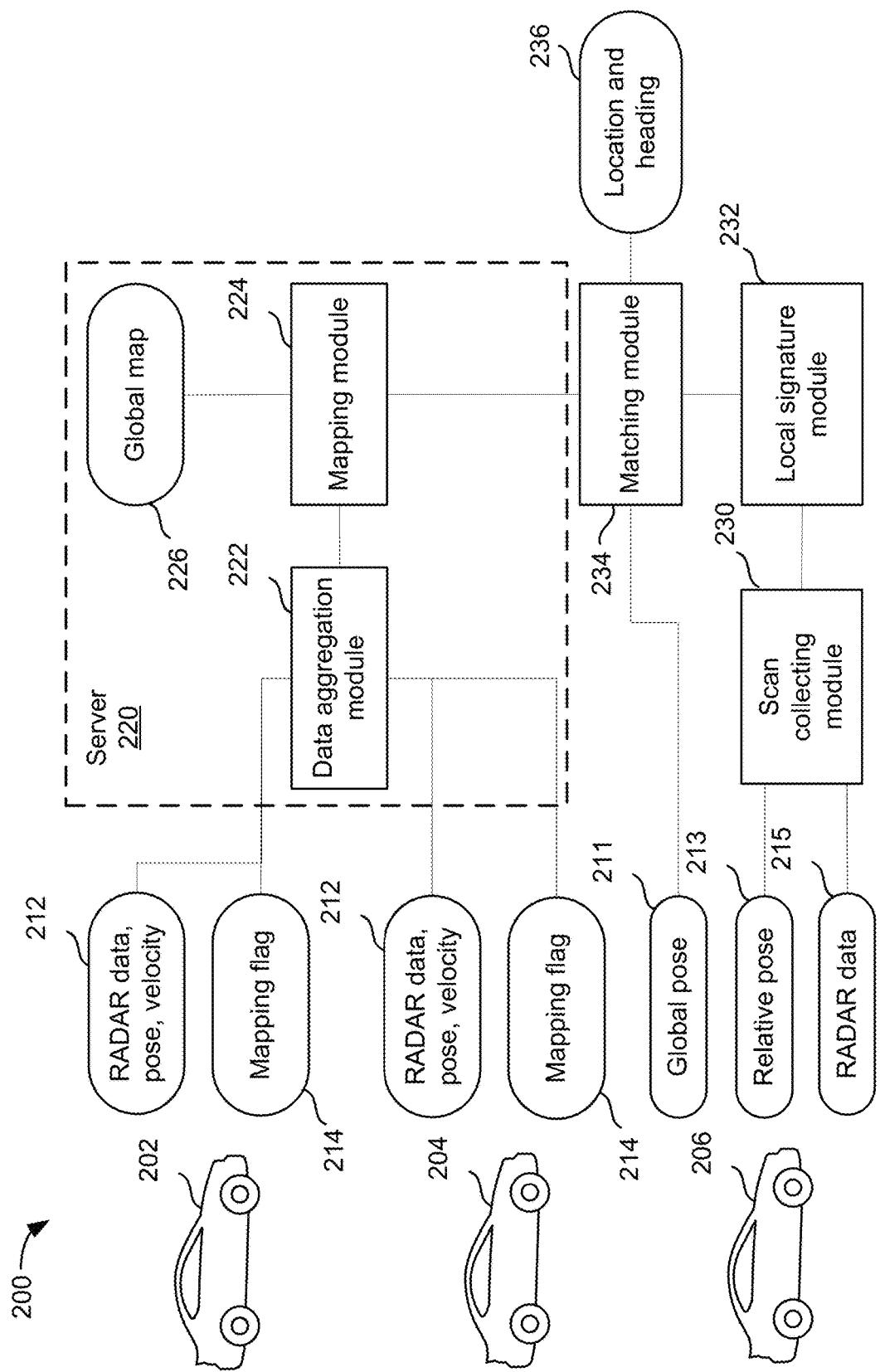
FIG. 2 shows an example schematic diagram of a RF ranging localization and mapping scheme, according to some aspects of the disclosure.

FIG. 2 is a schematic diagram illustrating a crowdsourcing radio detection and ranging (RADAR) map generation and localization scheme 200 according to some aspects of the present disclosure. In the scheme 200, two mapping vehicles 202, 204 are configured to obtain RADAR data, pose data, and velocity data 212. The RADAR data may be obtained using an onboard RADAR sensor, which may include an array of RADAR antenna elements configured to perform transmit beamforming and receive beamforming in a RADAR scan sequence about at least one axis. In some aspects, the RADAR sensor is configured to perform a scan sequence about at least the azimuthal axis. In other aspects, the RADAR sensor is configured to perform a scan sequence about the azimuthal axis and in an elevation direction to obtain 3D RADAR data. As will be explained further below, the RADAR data may be processed into batches, in some aspects, and may be assembled into at least one of a map or a point cloud. Further, the RADAR data may include or indicate doppler information, which may be related to the speed of the vehicle relative to targets in the scene, and vice versa. In some aspects, as explained above, the doppler information in the RADAR data may be useful in distinguishing moving objects from stationary objects in the scene. In some aspects, RADAR data may also include indicators of uncertainty for the point cloud data. For instance, the indicator of uncertainty may be a variance type information of the point cloud data, or it may be an indirect indicator of confidence in the detections through signal to noise ratio or radar cross section descriptors. Although the scheme 200 is described using RADAR data, it will be understood that the steps, actions, and other features of the scheme 200 may be performed using any suitable type of RF ranging data, including RADAR data, long term evolution (LTE) signal data, fifth generation new radio (5G NR) signal data, Wi-Fi signal data, ultrawideband (UWB) signal data, Bluetooth® signal data, and/or any other suitable type of RF-based signal data, as explained herein.

Raw RADAR data, which may include relative ranging and bearing data using RF frequencies, may not be associated with a global position or orientation. Accordingly, the vehicles 202, 204 may also obtain pose data, which may be used to project the RADAR point cloud data to a global reference frame. The pose data may include satellite-based global positioning data (e.g., GPS, GNSS, etc.), compass data, camera data, LIDAR data, or any other suitable type of data. For example, the pose data may be provided in an earth-centered earth-fixed (ECEF) frame. The pose data may include coarse global location accurate to within 1 m-50 m, such as 5 m or 10 m, for example. Further, the pose data may involve a combination or fusion of multiple data sources, including camera, LIDAR, wheel odometry, inertial measurement unit (IMU) data, GPS/GNSS, ultrasonic ranging/SONAR, and/or any other suitable type of data. In some aspects, one or more of the vehicles 202, 204 may be equipped with a global positioning sensor that cooperates with fixed global reference targets having known global coordinates.

The RADAR data, pose data, and/or velocity data 212 may be timestamped such that individual data points can be aligned or correlated in the time domain. In some aspects, individual points corresponding to individual RADAR beams may be timestamped. In other aspects, each scan comprising multiple beams may be timestamped with a single time. The RADAR data, pose data, and/or velocity data may be published or transmitted to a server 220 wirelessly. In some aspects, the server 220 may be referred to as a RF ranging assistance server. As will be explained further below, the remote server 220 may combine the data to generate, update, and/or modify a global RADAR map 226 based on the RADAR and pose data provided by the vehicles 202, 204. The global RADAR map 226 may then be published by the server 220 and made available for vehicles to use. The server 220 may control whether the data is published based on one or more trigger events. In this regard, the vehicles 202, 204 are configured with a mapping flag 214 or publishing flag, where the state of the mapping flag 214 may cause the vehicles 202, 204 to publish the RADAR data, the pose data, and/or the velocity data 212. For example, in some aspects, the server 220 may broadcast, to the vehicles 202, 204, whether the server 220 is accepting data for publication. The server 220 may transmit, for example, broadcast or dedicated messages to the vehicles 202, 204 indicating that mapping data may be published. The relevant factors for determining whether the server 220 is accepting data include the geographical region of the vehicle and data, map error reports from vehicles, indicating one or more issues with the global RADAR map 226, weather conditions of the geographical region of the vehicle/data, RADAR localization performance of vehicles using the global map, etc. For the purposes of the present disclosure, the global RADAR map 226 may include additional data to aid one or more vehicles with localization and/or navigation. In this regard, in some aspects, the global RADAR map 226 may be referred to as RF ranging assistance data. For example, the RF ranging assistance data may include a map, point cloud, or other RF-based localization information including semantic information or other metadata providing additional details about individual points or regions on the global RADAR map 226.

In other words, the server 220, which may be a cloud server, may indicate a request for new data if the global RADAR map 226 may be improved in some way by new data. Further, the server 220 may indicate that it is not accepting published RADAR data, pose data, and/or vehicle velocity data if the current global RADAR map 226 results in accurate localization performance from vehicles and this can be indicated by the vehicles to the server 220. Similarly, the server 220 may indicate it is accepting published data for RADAR mapping if the one or more vehicles report compromised or less reliable RADAR localization performance over certain duration of time. In another exemplary embodiment, if the server knows that the weather conditions are poor in a geographical region, the server 220 may indicate that it is not accepting data from one or more vehicles within that region. In some instances, the server 220 may request vehicles to publish new data if multiple reports on bad RADAR localization accuracy are obtained from vehicles in a short time frame. Further, depending on severity of bad reports from vehicles, the server 220 may choose to rebuild a global RADAR map from scratch with new data or maintain or repair the existing global RADAR map 226.

Further, the mapping flag 214 may be based on one or more conditions sensed by the vehicle. For example, the vehicles 202, 204 may have a negative (e.g., OFF) mapping flag state or indication so that the RADAR data, pose data, and/or vehicle velocity data 212 is not published to the server 220 even if the server 220 indicates that it is accepting data. For example, the vehicle 202 may analyze the LIDAR data, camera data, or other pose data to assess the quality or accuracy of the data 212. If the data 212 has a low score, due to bad weather conditions, for example, the mapping flag 214 may be off so that the data 212 is not published to the server 220. In some aspects, the vehicles 202, 204 may determine that the covariance estimates of pose show more uncertainty in current pose than usual, in which case the mapping flag 214 is turned OFF. In some aspects, the mapping flag may be in a state that allows partial map crowdsourcing data to be published. For instance, an ego vehicle may include different grades or classes of RADAR mounted on the ego vehicle. The mapping flag may be in a state such that only high quality RADAR data is available for pushing to the server 220.

In another aspect, if the vehicles 202, 204 are a dedicated fleet for conducting RADAR mapping, then the mapping flag 214 may be always ON, in which case the vehicle 202 may have a system that can provide pose in global frame in online/offline fashion. Offline data collection may refer to the ability to collect the online pose data published by the vehicle 202 and later smoothen out the online poste data in a non-causal offline manner to improve the accuracy of the pose data.

Once the server 220 receives the RADAR data, pose data, and velocity data 212 published by the vehicles, 202, 204, the data aggregation module 222 aggregates the data 212 and temporally aligns the data with timestamps with respect to a common clock. The data aggregation module 222 forwards the aggregated data to a mapping module 224. The mapping module 224 may be configured to use these inputs to generate a new global RADAR map and/or to maintain the existing global RADAR map 226 with the new inputs obtained. The global RADAR map 226 may have separate copies of the map for different driving directions on the road or may have a common map irrespective of driving direction. For instance, if the global RADAR map 226 is in the form of a static occupancy grid, there may be unique occupancy probability for each location in space. In another aspect, the occupancy probability for each location in space may vary depending on the driving direction. With more mapping runs from same vehicles 202, 204, or different vehicles over same region, the quality of the reference global maps may increase over time. In some aspects, a more frequently-updated crowdsourced reference RADAR map may provide better RADAR localization performance.

In some aspects, once the crowdsourced global RADAR map 226 is generated and being used for RADAR localization, the global RADAR map 226 may no longer be updated until vehicles driving in some region, which have both RADAR localization estimates as well as potentially more accurate estimates of location, report that RADAR localization is failing. In this case, the mapping module 224 may then accept the data published by vehicles for RADAR mapping. The server 220 may then either generate a new global RADAR map from scratch for that region with newly published data, or may update the existing global RADAR map 226 giving more priority to recent measurements.

Referring still to FIG. 2, a third vehicle 206 is shown operating in a RADAR localization mode. In this regard, vehicles 202, 204 may be described as operating in a mapping mode, whereby their RADAR and pose data 212 may be published to generate or maintain a global RADAR map 226 that may be downloaded and used by other vehicles in some situations, such as the third vehicle 206. In some aspects, vehicle 206 may download the crowdsourced map from the server based on a configured ability to consume the maps for certain ADS applications, for instance, localization. In some aspects, RADAR localization may be used as a supplemental localization mechanism, or as a secondary localization mechanism. For example, the third vehicle 206 may use RADAR localization in conditions where GPS-based, camera-based, and/or LIDAR-based localization methods are unreliable or unfeasible. For example, the third vehicle 206 may use RADAR localization in urban centers where GPS/GNSS reception is poor, in snowy, foggy, or rainy weather conditions, at night time, or in any other condition where RADAR localization may be more reliable than other localization methods.

Figure 3:
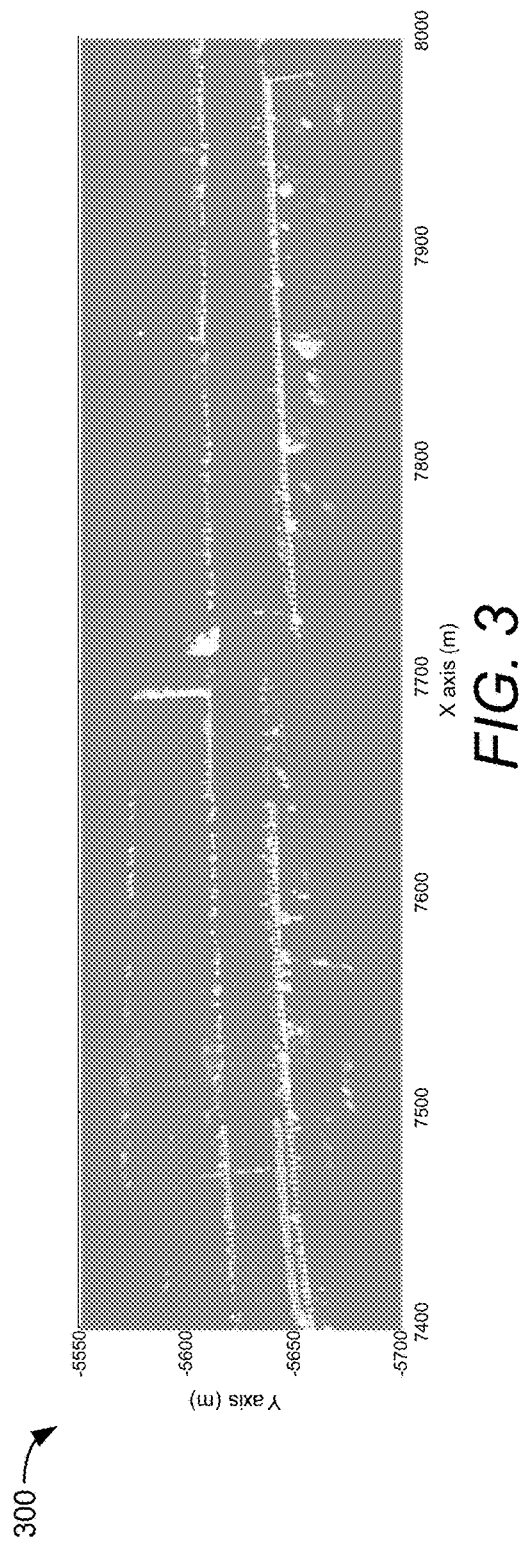
FIG. 3 is an example local RF ranging signature in the form of a RF ranging map, according to aspects of the present disclosure.
Figure 4:
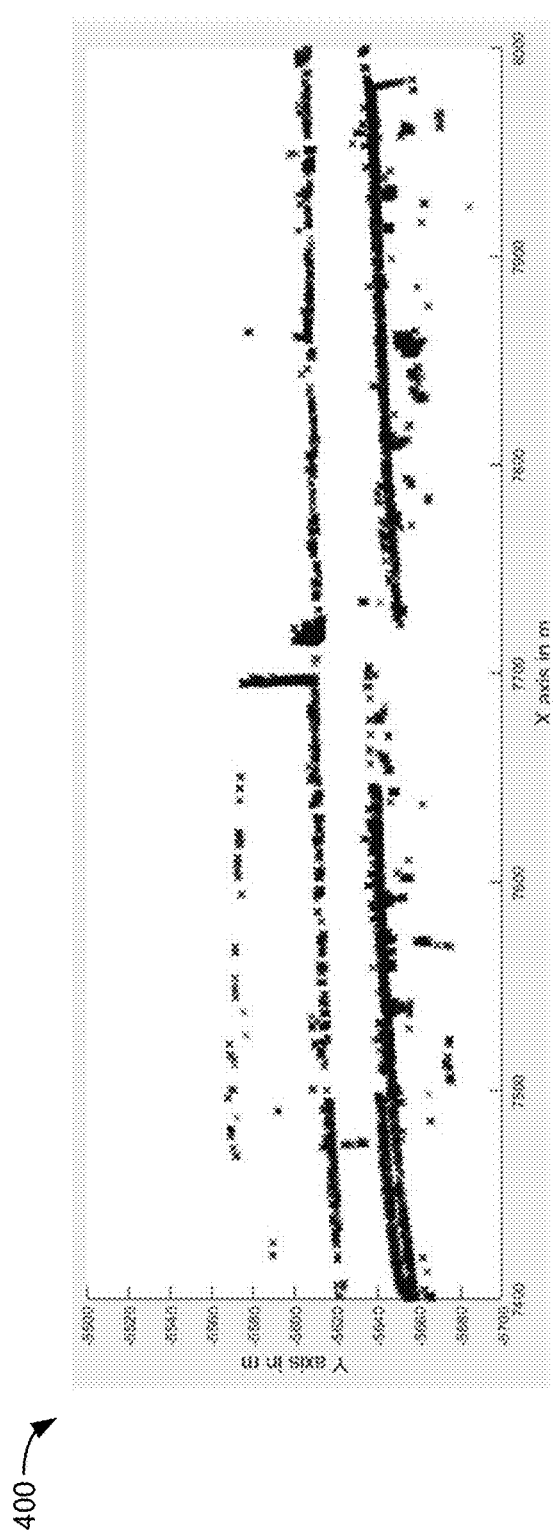
FIG. 4 is an example local RF ranging signature in the form of a point cloud, according to aspects of the present disclosure.

The third vehicle 206 may be driving in a region for which the global RADAR map 226 has already been generated based on crowdsourced RADAR and pose data. Accordingly, the third vehicle 206 may download the global RADAR map from the server. The third vehicle 206 may have some or all of the localization equipment and sensors as the vehicles 202, 204. The third vehicle 206 may collect RADAR data 215 along with relative pose data 213. In some aspects, the relative pose data 213 may indicate a change in relative pose. In some aspects, the third vehicle 206 may further collect global pose data 211 (e.g., GPS data, compass data). The third vehicle 206 may process the RADAR data 215 and pose data 211, 213 to form a batch using the scan collecting module 230. Radar point cloud data collected per timestamp may be with respect to the pose of the RADAR sensor. The local signature module 232 may be configured to use relative pose change 213 over a short duration of time window W, so that the batched RADAR data can be transformed to be with respect to a common reference frame, which may be pose of the vehicle 206 at some timestamp in time window W. The aggregated point cloud data may be referred to as a batch. For example, the third vehicle 206 may obtain the data over a small duration within 200 millisecond to 5 seconds, or any other suitable duration. The third vehicle 206 may include a processing system (e.g., 1118, FIG. 11; 1214, FIG. 12), which includes a processor and a memory device configured to execute the actions of the modules 230 and 232. For example, the local signature module 232 may be configured to convert timestamped RF ranging batches from the scan collecting module 230 to local RADAR signatures. An exemplary RADAR signature may be a local RADAR map or simply an accumulation of point cloud data with or without semantic information tagged to it. In this regard, FIG. 3 illustrates a local RADAR map 300, and FIG. 4 illustrates a local point cloud map 400. The third vehicle 206 may then publish the RADAR signature along with the coarse global position to the server 220.

The third vehicle 206 may further include a matching module 234 configured to use a matching algorithm. The matching algorithm may compare the local RADAR signature with the global RADAR map 226 in the cloud using the coarse global position and/or pose from the third vehicle 206 as an input. In another aspect, the server 220 may include the matching module 234 configured to perform the matching algorithm. The matching module 234 is configured to determine and output a global location and heading estimate of the third vehicle 206. An exemplary implementation may provide the location and heading estimates in 2-D horizontal plane with respect to fixed global reference frame on earth, such as an East-North-Up frame. An exemplary heading angle can be with respect to the up frame. An exemplary local RADAR signature could include a map, for instance a static occupancy grid map. In other aspects, the local RADAR signature may include point cloud accumulation. The RADAR point cloud accumulation may be provided in an unfiltered form or after filtering out moving obstacles and ghost targets from the RADAR.

Other variations of these aspects are contemplated by the present disclosure. For example, in one aspect, the matching module performs the matching based on a local and global RADAR signature. In some aspects, the global RADAR map 226 may be built with different sensor modalities. For example, the global RADAR map 226 may be generated based on digital camera data, satellite images and/or high-definition maps.

According to another aspect of the present disclosure, one or more vehicles, such as the vehicles 202, 204, may provide semantic information relevant to the RADAR and pose information published to the server 220. In this regard, as crowdsourcing vehicles obtain the RADAR data, pose data, and/or other location-related data to generate and maintain a global map, it may be desirable to distinguish static (permanent features in a scene) from dynamic objects (moving features in the scene) and temporary-static (features that are currently stationary but may be moved in near future) in a scene. Static or permanent features may include buildings, permanent fences, walls, trees, overpasses, streetlights, stop signs, and highway medians. Dynamic objects may include moving cars or walking pedestrians or bicyclists. Temporary-static objects may include, for example, parked cars, moving cars, construction signage and markers, cones. Sensor data indicating static objects may be published by ego vehicle to the server for crowdsourced mapping. In one exemplary method, the dynamic and temporary-static objects reflected in the RADAR data are also published for the crowdsourced mapping in a format that enables the server to distinguish such objects from permanently static objects. In another exemplary method, dynamic or temporary-static objects are removed completely or partially from the RADAR point cloud data by the vehicle before pushing the data to server. Temporary-static objects are likely to move within a short time frame, which may result in the published mapping data for those areas being less reliable. Accordingly, the present disclosure also describes systems, methods, and mechanisms for generating and providing semantic data with RADAR and pose data to compensate for objects in a scene that are likely temporary-static, or dynamic.

Figure 5:
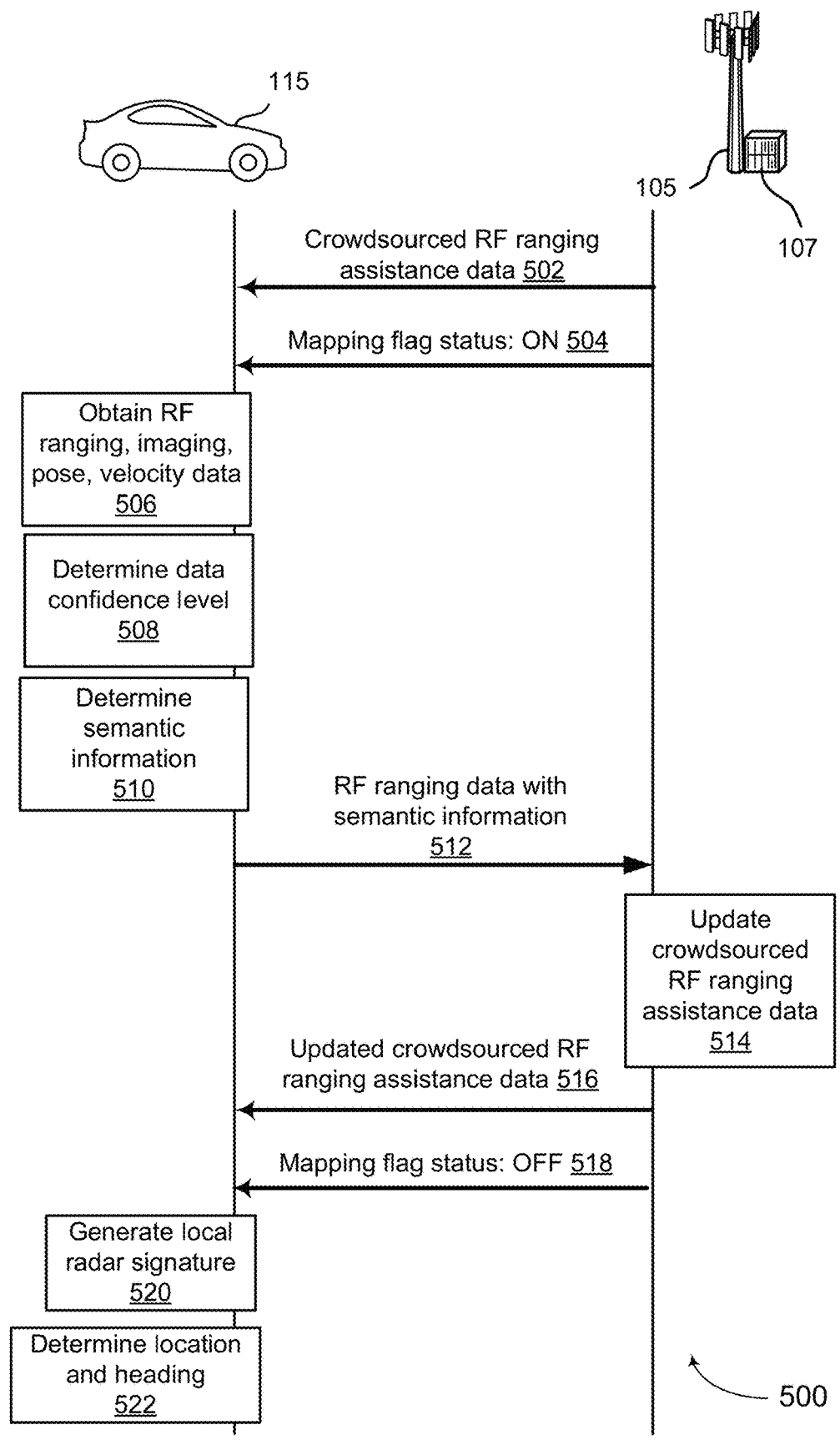
FIG. 5 is a singling diagram of a RF ranging localization and mapping scheme, according to some aspects of the present disclosure.

FIG. 5 illustrates a signaling diagram of RF ranging-based mapping and localization method 500 according to some aspects of the present disclosure. The method 500 includes a UE 115 and a network entity 105. The network entity 105 may be in communication with an RF ranging assistance server 107. The UE 115 may be coupled to, may include, or may otherwise be associated with a motor vehicle. However, the present disclosure also contemplates other types of devices for the UE 115, including unmanned vehicles, drones, cargo delivery vehicles, and/or any other suitable type of device which may use RF ranging data for localization and navigation. The method 500 may include aspects of the schemes, systems, and methods described in FIGS. 6-10. In some aspects, the method 500 may include wireless communications over a wireless communication network. The wireless communications may be based on one or more protocols or radio access technologies (RATs). For example, aspects of the method 500 may include communications over a long term evolution (LTE) wireless link, a fifth generation new radio (5G NR) wireless link, a Wi-Fi wireless link, ultrawideband (UWB) wireless link, a Bluetooth wireless link, and/or any other suitable type of wireless protocols or RATs. In this regard, one or more of the communications in the method 500 may be performed using a wide area network (WAN) and/or a local area network (LAN). In some aspects, one or more communications may be alternatively transmitted using a sidelink wireless communication mechanism. for example, one or more of the communications of the method 500 may be communicated based on a vehicle-to-vehicle (V2V), vehicle to everything (V2X), or other vehicle-based sidelink communication protocols.

At action 502, an RF ranging assistance server 107 transmits, via the network entity 105 to the UE 115, crowdsourced RF ranging assistance data. The crowdsourced RF ranging assistance data may include mapping data, RF ranging point cloud data, or other RF ranging assistance data configured to assist the UE 115 and/or other UEs with RF ranging localization, object detection, object verification, object prediction. In some aspects, the RF ranging assistance data may be location-tagged and/or timestamped. The RF ranging assistance data may be based on RF ranging data, imaging data, and/or other sensor fusion data from one or more other UEs. The RF ranging assistance server 107 may be configured to correlate and aggregate different types of navigation data to generate the RF ranging assistance data. As explained for the below, the RF ranging assistance data may be based on RADAR data, Wi-Fi signal data, LTE signal data, 5G NR signal data, UWB signal data, and/or any other suitable type of RF ranging data. The imaging data may include digital camera images, LIDAR data, and/or any other suitable type of data. The RF ranging assistance data may include metadata or semantic information designating one or more object types for one or more portions of the RF ranging assistance data. For example, a first portion of the RF ranging assistance data may be associated with a static object type, a dynamic object type, and/or a temporary-static object type. In other aspects, the RF ranging assistance data may exclude or remove portions of the data associated with temporary-static object types. In some aspects, the RF ranging assistance data and the semantic information may include an indication of a probability that different portions of data are associated with the temporary-static object type and/or the static object type.

At action 504, the RF ranging assistance server 107 causes the network entity 105 to transmit, to the UE 115, a mapping flag indicator. In the illustrated example, the mapping flag indicator indicates that the mapping flag status is ON. Accordingly, the mapping flag status indicator may indicate to the UE 115 that the RF ranging assistance server 107 is accepting RF ranging data, imaging data, and/or other types of position-related data to update or modify the RF ranging assistance data. In another example, the mapping flag status may be OFF. In that case, the mapping flag status may indicate to the UE 115 that the RF ranging assistance server 107 is not accepting RF ranging data, imaging data, or other types of localization or navigation data used to update the crowdsourced RF ranging assistance data. In one example, the RF ranging assistance server 107 may transmit the mapping flag status indicator in response to the UE 115 connecting to a LAN. In other aspects, the RF ranging assistance server 107 may not transmit the mapping flag status indicator. For example, the UE 115 may be configured to transmit RF ranging data, imaging data, pose data, ego related data, or any other positioning data to the RF ranging assistance server 107 via the network entity 105. The RF ranging assistance server 107 may be configured to discard or ignore the incoming RF ranging data, imaging data, etc. based on one or more triggering conditions. The one or more triggering conditions may include, for example, a data quality indicator associated with the RF ranging data, imaging data, or other position-related data, at time of day, weather conditions associated with the RF ranging data, vehicle information, such as the make, model, trim, or other identifying aspects of the vehicle, the sensor type or characteristics associated with the sensor used to obtain the RF ranging data, imaging data, etc.

At action 506, the UE 115 obtains RF ranging data, imaging data, location data, pose data, velocity data, and/or any other position-related data. In some aspects, obtaining the RF ranging data comprises obtaining RADAR data. However, other RF ranging data types are also considered, including Wi-Fi signal data, 5G NR signal data, LTE signal data, UWB signal data, and/or any other suitable type of RF ranging data. In some aspects, action 506 comprises using an array of RF ranging sensors and signal beamforming to direct and receive RF ranging signals and signal reflections in directed beams. In some aspects, various RF ranging signal processing techniques may be used 2 remove or reduce signal artifacts, remove dynamic or moving objects indicated by frequency shifting, signal averaging from multiple beams or bursts, signal intensity threshold filtering, and/or other suitable RF ranging signal processing techniques. The RF ranging data may be timestamped. In another aspect, the RF ranging data may be 2-dimensional RF ranging data or 3-dimensional RF ranging data. Doppler velocity estimates of targets in the field of view of the RF ranging sensor may be used to remove or tag moving objects or obstacles in the field of view. In some aspects, obtaining the RF ranging data may include identifying and removing or suppressing false targets based on a RADAR cross section and/or a signal to noise ratio (SNR).

As mentioned above, the UE 115 may also obtain pose data, heading data, velocity data, relative pose data, coarse global position, wheel odometry data, and/or any other suitable type of position-related data. The additional position-related data may be combined with the RF ranging data and/or the imaging data and time synced with the RF ranging data and/or imaging data to determine the global positions of each portion of the RF ranging data. The additional position-related data may be timestamped using a common timestamp or time sync module (e.g., time sync module 1202, FIG. 12) such that the RF ranging data and/or the imaging data can be temporally correlated with the additional position-related data. In some aspects, the UE 115 may be configured to temporally and spatially correlate the RF ranging data and/or imaging data to a global frame in batches. The batches may span a duration of several milliseconds to several seconds. For example, the batches may be accumulated over durations of 200 milliseconds, 500 milliseconds, one second, 1.5 seconds, 2 seconds, 4 seconds, 5 seconds, and/or any other suitable duration, greater or smaller. In some aspects, generating the batched data may also include or involve vehicle calibration information. For example, the vehicle calibration information may include geometric characteristics of the various sensors, electronic components, and/or structure of the vehicle. The vehicle calibration information may be used, for example, to transform the RF ranging data into a vehicle body frame. The vehicle body frame may be a rear axle frame, a front axle frame, a vehicle-centered frame, or any other suitable vehicle body frame.

At action 508, the UE 115 determines a confidence level or data quality metric associated with the RF ranging data, the imaging data, and/or the other position-related data. For example, the data quality metric may be based on or include a signal to noise ratio (SNR), average signal intensity, external conditions information (e.g., weather, time of day, etc.), or any other suitable type of data quality information. In other embodiments, the UE 115 may not determine a confidence level or data quality metric associated with the RF ranging data. In some aspects, the RF ranging assistance server 107 may determine a confidence level or data quality metric associated with the RF ranging data, the imaging data, or the other position-related data. In some aspects, the data quality metric may be mapped onto specific portions or data points in the RF ranging data, imaging data, or other position-related data. In other aspects, and overall data quality metric may be transmitted by the UE 115 with every batch.

At action 510, the UE 115 determines semantic information associated with the RF ranging data, imaging data, pose data, velocity data, or other position-related data. As described further below, the semantic information may indicate one or more object types associated with one or more portions of the RF ranging data, imaging data, or position-related data. For example, the semantic information may indicate that a first portion of the RF ranging data is associated with a static object type, and that a second portion of the RF ranging data is associated with a temporary-static object type. In some aspects, the UE 115 may determine or identify dynamic objects and static objects. For example, the UE 115 may identify and differentiate dynamic objects vs static objects based on RF doppler information indicated in the RF ranging data. In some aspects, after determining or identifying dynamic objects in a RF ranging scan, RF ranging scan batch, and/or RF ranging local signature, the UE 115 may tag dynamic objects or RF ranging points in the point cloud as dynamic. In another example, the UE 115 may remove or discard any points or portions of the RF ranging data associated with dynamic objects. In some aspects, the UE 115 may further identify different static object types or subclasses. For example, the UE 115 may be configured to use the imaging data and/or the RF ranging data to identify guard rails, medians, or permanent edifices. These objects may be tagged or otherwise identified in the RF ranging data as static or permanent objects. For example, the UE 115 may be configured to tag the points or portions of the RF ranging data associated with permanent structures as a static object type or class. Further, the UE 115 may be configured to identify, based on the RF ranging data and/or the imaging data, temporary-static objects such as parked cars, construction signage, trailers, or other temporary-static objects. For example, the UE 115 may be configured to assign or tag all non-moving, static objects in the scene as having a static object type, and further assign or tag one or more of the static objects to "permanent" or "temporary" subclasses. The UE 115 may indicate object type and/or subclass in the semantic information. In other aspects, the UE 115 may identify dynamic objects, static objects, and temporary-static objects as different types or classes.

In some aspects, the UE 115 may determine the semantic information by processing the RF ranging data, imaging data, and/or other position-related data. For example, the UE 115 may be configured to identify types of objects such as cars, construction barriers, construction signage, trailers, and/or other identifiable shapes in a field of view. When the imaging data is temporally and spatially correlated or mapped with the RF ranging data as explained above, individual points or portions of the RF ranging data can be tagged or marked based on their object type. In some aspects, the semantic information may include a range of values indicating a likelihood that a given portion of data or point of an RF ranging data point cloud is a temporary-static object. In another aspect, the semantic information may indicate a value associated with a likelihood that the corresponding object in the RF ranging data is likely to be present two hours into the future, three hours into the future, six hours into the future, and/or other durations of time.

Although the method 500 is described with the UE 115 determining the semantic information, it will be understood that the RF ranging assistance server 107 may determine the semantic information based on the RF ranging data, imaging data, and/or other position-related data provided by the UE 115.

At action 512, the UE 115 transmits, and the network entity 105 receives, the RF ranging data with the semantic information. It will be understood that action 512 may also include transmitting imaging data, pose data, velocity data, or other position-related data. In some aspects, action 512 may occur periodically with batches of RF ranging data and semantic information. In other aspects, action 512 only occurs based on a request from the RF ranging assistance server 107 provided via the network entity 105. In some aspects, the UE 115 may be configured to transmit the RF ranging data and semantic information over a WAN while traveling on a road. In another example, the UE 115 may be configured to transmit the RF ranging data and semantic information based on or in response to connecting to a LAN. for example, the UE 115 may be configured to transmit the RF ranging data with the semantic information based on connecting to a home Wi-Fi network, to a Bluetooth device, and/or any other suitable local network.

At action 514, the RF ranging assistance server 107 updates the crowdsourced RF ranging assistance data based on the RF ranging data and/or semantic information provided by the UE 115. For example, the RF ranging assistance server 107 may be configured to update a status of temporary-static objects based on the RF ranging data and semantic information provided by the UE 115. In some aspects, the RF ranging assistance server 107 may update an object type of one or more portions of the RF ranging assistance data based on the RF ranging data and semantic information provided by the UE 115. In other aspects, the RF ranging assistance server 107 may be configured to use data averaging techniques to modify portions or points of the RF ranging assistance data to improve accuracy of an RF ranging map or point cloud over time. In another aspect, the RF ranging assistance server 107 may be configured to discard or disregard previous RF ranging assistance data based on a comparison of the RF ranging data transmitted at action 512 with the previously existing RF ranging assistance data. For example, if the RF ranging data transmitted at action 512 is significantly different than the RF ranging data used to generate the RF ranging assistance data, the RF ranging assistance server 107 may determine that one or more permanent changes to the navigating environment in that region have changed. For example, the RF ranging data transmitted at action 512 may indicate that new traffic barriers or other permanent structures have been placed in a route that did not previously exist.

At action 516, the RF ranging assistance server 107 transmits, via the network entity 105 and to the UE 115, the updated crowdsourced RF ranging assistance data. The updated crowdsourced RF ranging assistance data may be based on the RF ranging data and/or the semantic information transmitted at action 512.

Actions 518-522 may illustrate an RF ranging localization portion of the method 500. For example, in some instances, the UE 115 may not be configured to, or requested to, transmit RF ranging data and/or semantic information to the RF ranging assistance server 107. For example, at action 518, the RF ranging assistance server 107 transmits, via the network entity 105 to the UE 115, a mapping flag status indicator indicating that the mapping flag status is off. Accordingly, the RF ranging assistance server 107 indicates to the UE 115 that it is not accepting new RF ranging data and/or semantic information. In some aspects, the mapping flag status may be based on external conditions. In other aspects, the mapping flag status may be based on a quality of the RF ranging assistance data relative to the quality of recently received RF ranging data. In other aspects, the UE 115 may autonomously determine whether or not to transmit new RF ranging data and/or semantic information based on local conditions, time of day, data quality, and/or any other suitable condition.

At action 520, the UE 115 generates a local RADAR signature based on obtained RF ranging data. Generating the local RADAR signature may include batching several scans of RF ranging data and aligning each scan to a common frame based on pose, velocity, heading, wheel odometry, and/or other data. For example, the UE 115 may be configured to modify or adjust the relative locations of individual RF ranging data points based on the timestamp associated with each data point, the velocity associated with the data points, the wheel odometry data, inertial measurement data, and/or any other suitable type of data to map individual RF ranging scans to a common frame.

At action 522, the UE 115 determines a location and heading of the UE 115 based on a matching algorithm comparing the local RF ranging signature with the RF ranging assistance data provided by the RF ranging assistance server 107. For example, the UE 115 may be configured to select or identify a portion of the RF ranging assistance data based on a coarse location of the UE 115 and the local RF ranging signature. The UE 115 may be configured to use a similarity metric or other mapping procedure as described herein two identify the location and heading of the UE 115 in a global frame. In some aspects, action 522 may further include transmitting, to the RF ranging assistance server 107 via the network entity 105, one or more of the RF ranging local signatures and/or batches. in another aspect, action 522 may further include transmitting, to the RF ranging assistance server 107, the location and/or heading information for the UE 115.

It will be understood that the UE 115 may use the semantic information and/or the RF ranging assistance data to perform one or more aspects of localization, navigation, obstacle avoidance, and/or RF ranging mapping. For example, in some aspects, the UE 115 may be configured to use the RF ranging assistance data and/or the semantic information included therein for object verification and or object location verification. For example, the UE 115 may determine, based on a current pose or location of the UE 115 and the imaging data, whether static or temporary static objects identified using the RF ranging sensor and/or imaging sensors are associated with a correct object class or type as indicated in the RF ranging assistance data. In another aspect, the UE 115 may use the RF ranging assistance data for object prediction. For example, the UE 115 may be configured to determine or predict one or more object types based on the RF ranging data in situations where visibility is limited and thus imaging data may be unreliable. The UE 115 may return to confirm the previously determined object type or class using imaging data once the object is within a shortened visual range. For example, the UE 115 may be configured to identify static an/or temporary-static objects ahead based on the RF ranging data using the RF ranging assistance data as an input. If the RF ranging data indicates an object present in a field of view which the RF ranging assistance data does not include, the UE 115 may assume that the detected object is a temporary-static object. The UE 115 may confirm the object type or class when the UE 115 is within a shortened visual range such that the object can be identified using imaging data.

In another aspect, the RF ranging assistance data may include object classifications or types associated with temporary and non-hazardous objects, such as trash, bags, or other objects. In this regard, the UE 115 may treat differently temporary-static objects that are non-hazardous compared to temporary-static objects that are hazardous, such as parked cars or construction equipment. For example, non-hazardous trash on or near a road may not cause the UE 115 to adjust a direction of travel or speed. However, if the RF ranging assistance data indicates a stopped car on the side of the highway along a route of travel, the UE 115 may be configured to adjust its route or heading to change lanes, slow down, or pick an alternate path, for example. In some aspects, the combination of imaging data and RF ranging data may be beneficial to the determination of risk or hazard associated with the detected object. For example, some objects may be large and very visible to the imaging sensors, such as empty boxes, empty trash bags, tumbleweeds, etc., but may be less visible or invisible to the RF ranging sensors. Accordingly, the RF ranging data obtained by the UE 115 may be used in conjunction with the imaging data to predict or determine a level of risk or hazard associated with the detected object. In another aspect, the UE 115 may be configured to update or otherwise modify its route of travel based on new RF ranging assistance data received from the RF ranging assistance server 107. For example, the RF ranging assistance data provided by the RF ranging assistance server 107 may identify blockages, whether temporary or permanent, that other GPS mapping data for navigation purposes may not include. Accordingly, the RF ranging assistance data may provide more up-to-date information to optimize travel route plans and other navigation decisions by the UE 115.

Figure 6:
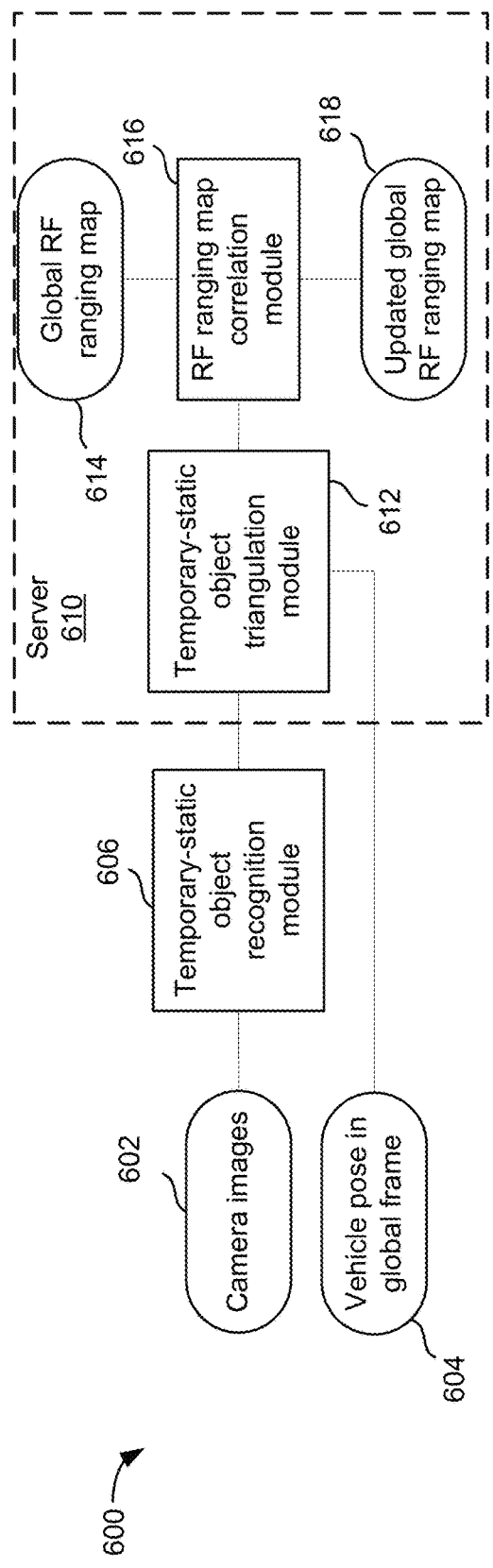
FIG. 6 shows an example schematic diagram of a RF ranging localization and mapping scheme with semantic information, according to some aspects of the disclosure.
Figure 7:
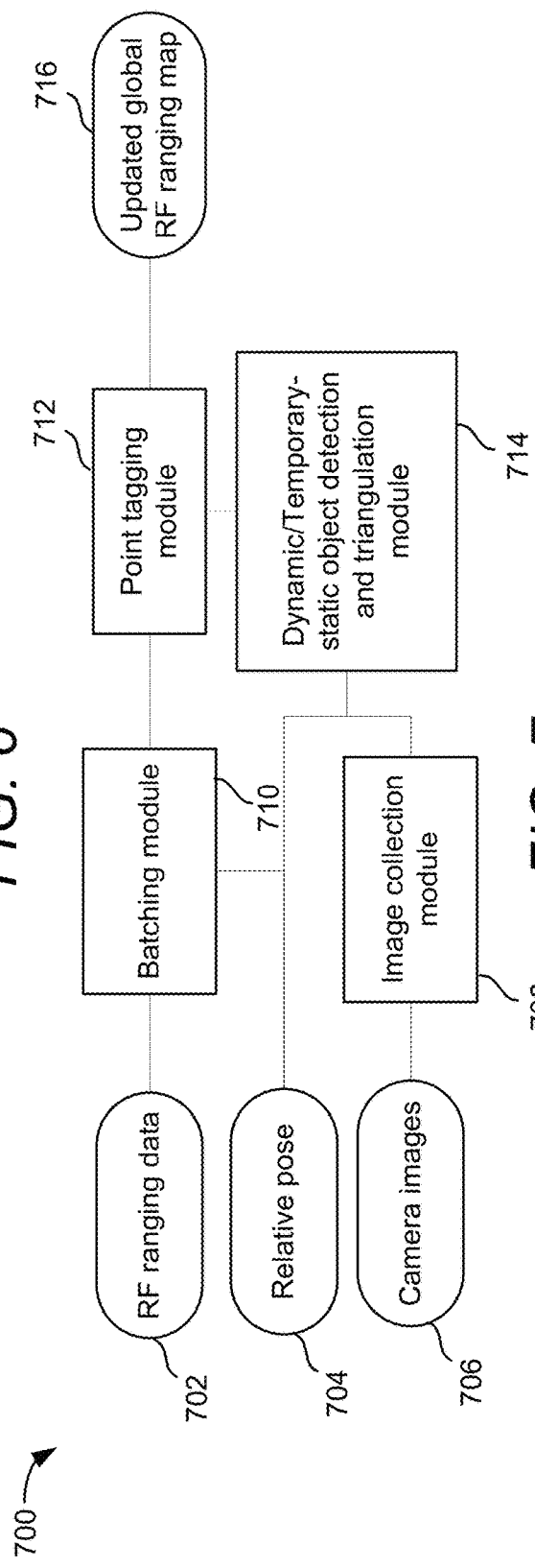
FIG. 7 shows an example schematic diagram of a RF ranging localization and mapping scheme with semantic information, according to some aspects of the disclosure.

FIGS. 6 and 7 are diagrams illustrating crowdsourced RF ranging map generation schemes with side information or semantic information, according to aspects of the present disclosure. In some aspects, the diagram may illustrate a scheme for RF ranging assistance data generation using a map-based RF ranging local signature. As explained above, RF ranging may include or contemplate RADAR, LTE signals, 5G NR signals, UWB signals, and/or any other suitable type of signals. FIG. 7 may illustrate a scheme for RF ranging map generation using a point cloud-based RF ranging local signature. The schemes illustrated in FIGS. 6 and 7 may be performed by one or more vehicles and a remote server, for example. In some aspects, the vehicles may include a processing module, such as the module 900 shown in FIG. 9, and/or the pipeline 700 shown in FIG. 7.

Referring to FIG. 6, the diagram illustrates a pipeline 600 using camera RF ranging fusion to remove or tag temporary-static objects (e.g., parked cars, construction barriers) from crowdsourced RF ranging map data. In the illustrated example, camera images 602 are passed to a temporary-static object recognition module 606, which may be configured to identify temporary-static objects in one or more of the camera images 602. An example representation of identified temporary-static objects could be a bounding box that describes a shape of a parked car. The temporary-static object triangulation module 612 may then estimate the distance to the temporary-static objects in the scene by successively tracking multiple instances of the temporary-static objects in the camera images 602 and triangulating using the vehicle pose information 604. The vehicle may transmit a message including the temporary-static object recognition data, which may be timestamped with the corresponding RF ranging data. Once the relative distance of the temporary-static objects in the scene from the vehicle is identified, the server 610 may identify the global coarse location of the temporary-static objects using the RF ranging map correlation module 616. This information can be used along with a RF ranging map 614, which includes static obstacles, to identify and remove the temporary-static object from the RF ranging map 614. If the RF ranging map 614 includes an occupancy grid map, the grid cells corresponding to the temporary-static objects may be replaced with a fixed small probability of occupancy. In some aspects, the pipeline 600 illustrated in FIG. 6 may be used to identify, tag, and/or remove dynamic objects from RF ranging data.

Referring to FIG. 7, the diagram illustrates a pipeline 700 using camera RF ranging fusion to remove dynamic objects from a RF ranging point cloud or batch scan data aggregated over a period of time. In some aspects, a batching module 710 may batch the RF ranging data 702 aggregated over a few milliseconds, 100 milliseconds, 200 milliseconds, 500 milliseconds, 1 second, 2 seconds, 4 seconds, 5 seconds, 6 seconds, 10 seconds, or any other suitable amount of time. Similar to the pipeline 600 shown in FIG. 6, the pipeline 700 in FIG. 7 includes an image collection module 708 that passes camera images 706 obtained over the batch scan period to a temporary-static object detection and triangulation module 714 to identify the locations of probable temporary-static objects in the point cloud data. The points in the point cloud data that correspond to the detected temporary-static objects can be tagged by the point-tagging module 712 as temporary-static objects. The tagged data may be referred to as semantic data. In some aspects, the points in the point cloud may be removed by a server. In other aspects, the points in the point cloud may be removed by a processor of the vehicle. The tagged data may then be combined with previously obtained RF ranging assistance data to generate an updated global RF ranging map 716. The vehicle may then publish the updated global RF ranging map 716 to the RF ranging assistance server Another aspect of the present disclosure is that semantic information 808 to the RF ranging map may be used for purposes other than global RF ranging map generation. In some aspects, semantic information may be used as an input to a matching module with other maps built from camera imaging data or other sensor data for improving vehicle localization and navigation. In this regard, another aspect of the present disclosure is illustrated in the pipeline 800 shown in FIG. 8. The pipeline 800 may include a matching module 810 configured to receive a local RF ranging signature 804 and a coarse global location 806, and to compare the local RF ranging signature 804 with the global RF ranging assistance map 802 based on the coarse global location 806. As explained above, the global RF ranging assistance map 802 may be referred to as RF ranging assistance data. For example, the global RF ranging assistance map 802 may include RF ranging-based mapping information, semantic information, map time information, and/or other information that may be used for RF ranging localization. In the pipeline 800, the vehicle may add to the local RF ranging signature 804 an additional input of semantic information 808 indicating potential dynamic and/or temporary-static objects in the local RF ranging signature 804 as an input to a matching module 810 applying a matching algorithm. For example, the matching algorithm may utilize a similarity metric (e.g., sum squared difference, normalized cross correlation, etc.) to provide a score on a match between the local RF ranging signature 804 and different portions of the global RF ranging assistance map 802. In some aspects, the similarity metric computation may utilize grid cells corresponding to parked cars or other temporary-static objects in the global RF ranging assistance map 802 as indicated in the semantic information 808, and apply a lower weight from these grid cells as compared to permanent static objects in global RF ranging assistance map 802. In some aspects, the similarity metric computation may utilize the grid cells or point cloud corresponding to parked cars or other temporary-static objects in local RF ranging signature but apply a lower weight from these cells as compared to permanent static objects in the local RF ranging signature 804. Based on the matching algorithm facilitated by the matching module 810, the pipeline 800 is configured to output a refined global location 812. The refined global location 812 may include a more precise and/or more accurate location compared to the coarse global location 806. The refined global location 812 may include a refined heading or global orientation.

In an exemplary implementation, the matching algorithm applied by the matching module 810 is a scan-to-map algorithm. In this example the local RF ranging signature 804 may include a batch scan (point cloud aggregated over short duration of time). In one aspect, the matching module 810 is configured to apply a likelihood field approach wherein the objective is to maximize p(z|x,m) where z is the batch scan, x is the pose to be optimized and m is the global RF ranging assistance map 802. If each measurement in z is independent of the other and is associated to nearest occupied cell in m for a given x with Gaussian noise assumption, the matching algorithm may include or involve minimizing $\Sigma_i d_i^2$ where i is a point target in batch scan and $d_i$ is its corresponding distance to nearest occupied cell in the map m. If nearest occupied cell for certain point targets i are tagged to be dynamic or temporary-static objects, then matching module 810 may exclude those points or apply a lower weight to those points than the rest of the points.

In another exemplary implementation, the matching algorithm is a map-to-map algorithm. In this case the local RF ranging signature 804 may include a local RF ranging map. In some aspects, a sum squared distance or cross correlation similarity is used for validating the similarity of the global RF ranging assistance map 802 and the local RF ranging signature 804. In this example, the additional semantic information 808 of dynamic objects and/or temporary-static objects may be used to first modify the occupancy values of the map cells before computing the similarity metrics.

Figure 8:
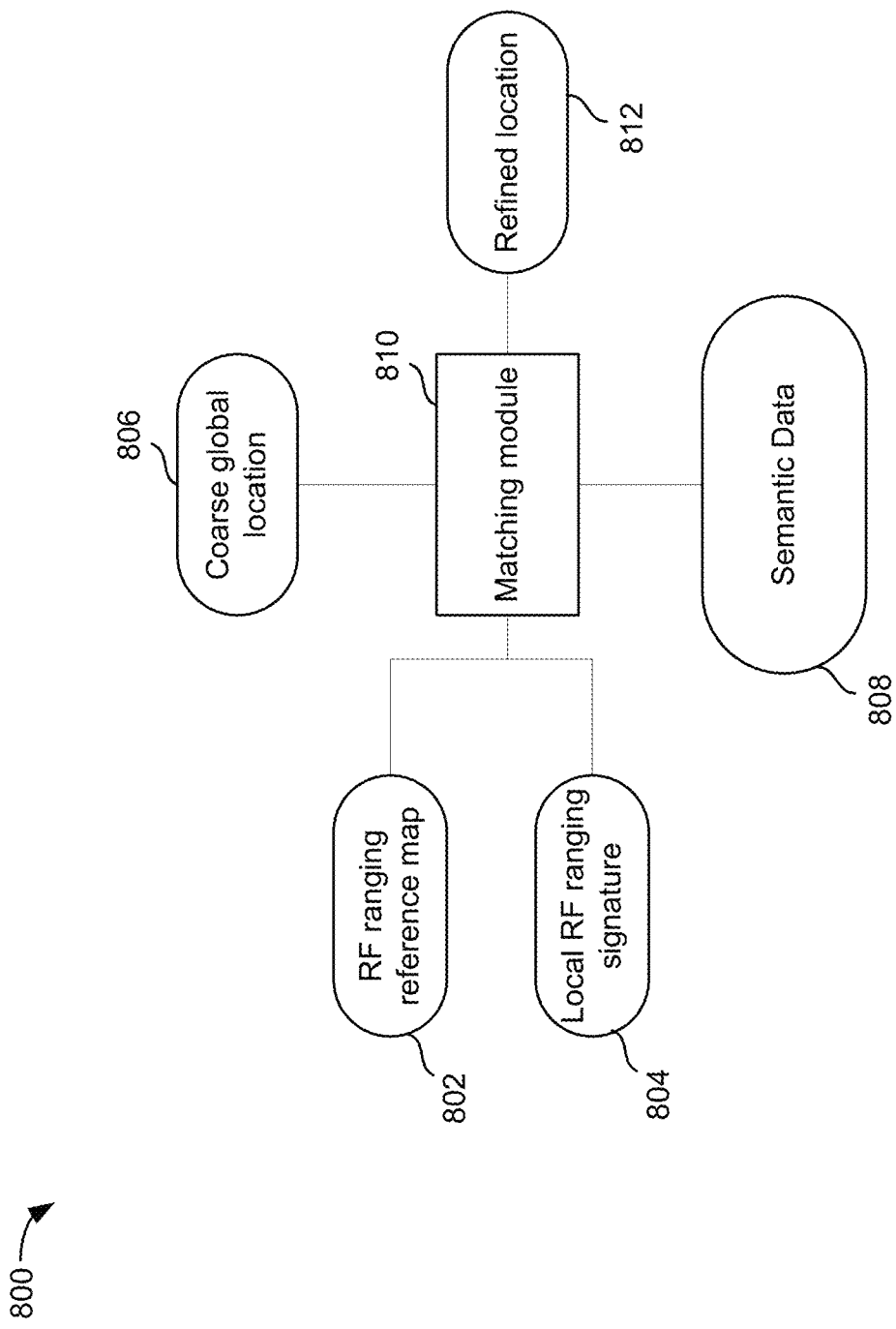
FIG. 8 shows an example schematic diagram of a RF ranging localization and mapping scheme with semantic information, according to some aspects of the disclosure.

In some aspects, semantic information indicating whether a RF ranging target is static or dynamic may be obtained using RF ranging data only. Thus, for RF ranging localization in conditions that do not allow for RF ranging and camera/LIDAR data fusion, a vehicle localization system may be configured to identify and distinguish different types of static, dynamic and/or temporary-stationary targets in a scene (e.g., low-hanging road sign, overpass). For example, a machine learning or artificial intelligence algorithm may be employed to identify patterns or characteristics in a RF ranging map or point cloud that correlate to a static object, or to a dynamic object. The machine learning algorithm may be employed using a similar scheme as illustrated in FIG. 8.

Figure 9:
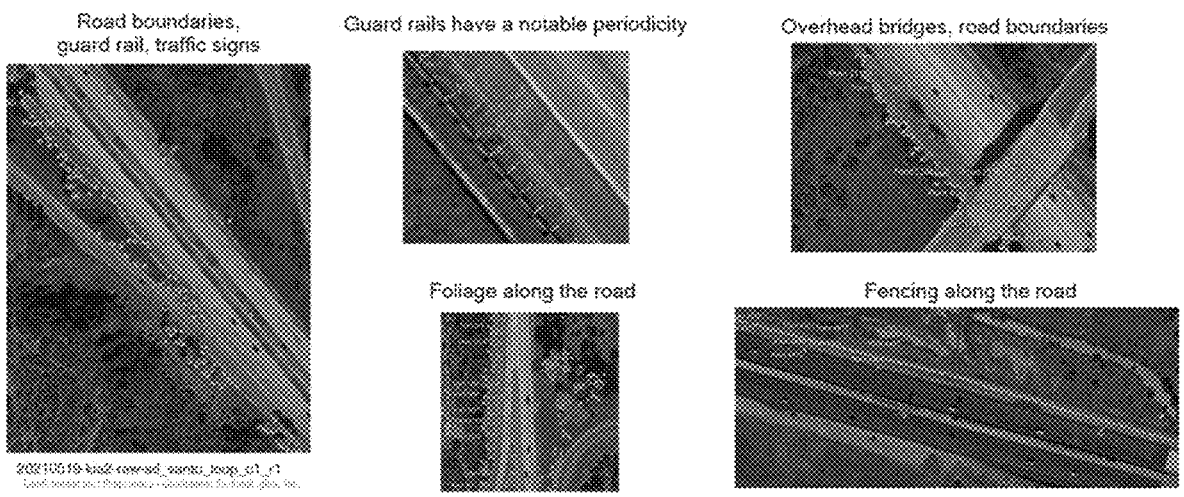
FIG. 9 illustrates a RF ranging point cloud of static and temporary-static objects in a scene identified using deep learning techniques, according to aspects of the present disclosure.
Figure 10:
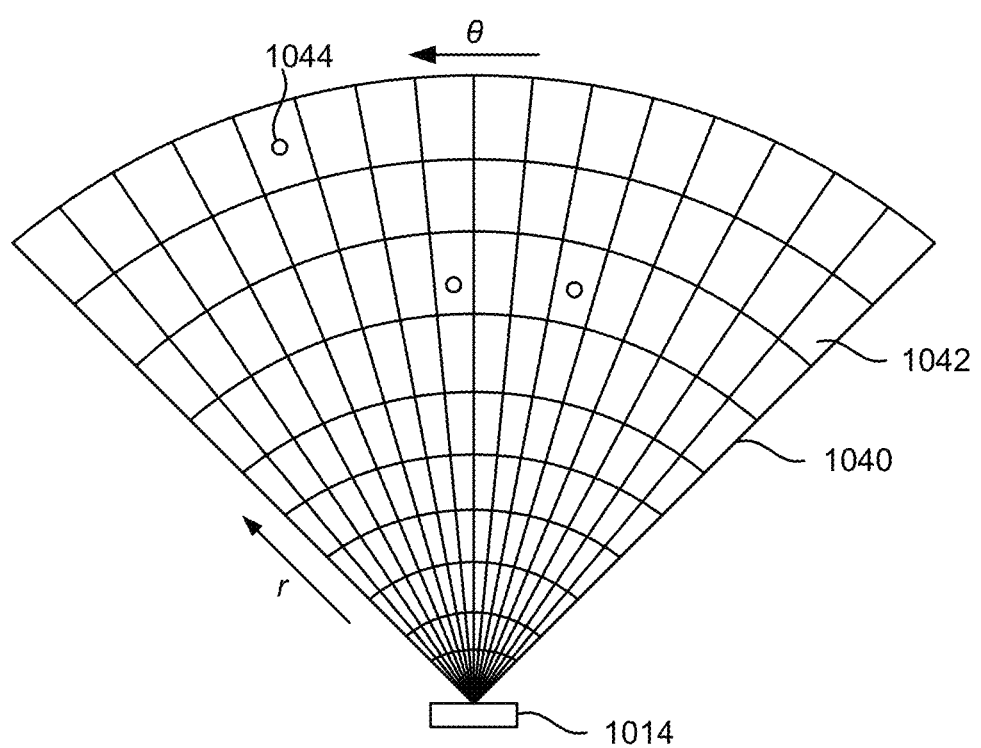
FIG. 10 illustrates a sensed observation RF ranging grid, according to some aspects of the disclosure.

FIG. 9 illustrates a plurality of scenes with overlaid RF ranging point targets corresponding to static targets identified by a machine learning algorithm. As shown in FIG. 10, dynamic objects, such as moving cars on the road, have been removed from the RF ranging data set. Other objects, such as foliage, guard rails, traffic signs, road barriers, fencing, and overhead bridges are identified as static or permanent targets. For example, the machine learning algorithm may detect the overhead bridge as a static target based on the position and shape of the target relative to the road, and that the target is stationary. In this regard, the machine learning algorithm may also use doppler information from the RF ranging data to distinguish temporary-static and dynamic targets from permanently stationary targets.

In some aspects, a deep learning network may be used to classify RF ranging point cloud clusters as either being a metal guard rail or a fencing or an overhead bridge or a traffic sign. A similar mechanism may be used in urban scenarios to detect building edges visible along the road. The edges may be represented as a collection of line features by the feature detection algorithm. In one exemplary implementation, a deep learning network may also identify the building edges as separate features. Such features could be given higher importance during the matching operation.

FIG. 10 illustrates a sensed observation RF ranging grid, according to some aspects of the disclosure. A transmitter (e.g., an array of transmit antennas) of the RF ranging source 1014 transmits pulses of electromagnetic RF waves that reflect from object(s) in the transmission path. A portion of the electromagnetic RF waves that are reflected from the object(s) are returned to the receiver (e.g., an array of receive antennas) of the RF ranging source 1014, which is usually located at the same site as the transmitter of the RF ranging source 1014.

In an aspect, the RF ranging source 1014 may be an imaging RF ranging that uses beamforming to scan horizontally and vertically. Beamforming is a technique used to aim the effective direction of a RF ranging beam by changing the delay between different transmitting antennas so that the signals add constructively in a specified direction. Thus, the RF ranging source 1014 may scan horizontally and vertically across the sensing area by using a transmitter comprising an array of electronically steered antennas.

The returned responses (which may also be referred to as "pings") measured by the RF ranging source 1014 can be characterized as an observation (or occupancy) grid 440 having a plurality of observation cells 1042. Each cell 1042 represents the measured returned response value at a specific range (r) and angle/azimuth (θ). Each cell 1042 is alternately referred to as a range-angle bin. Features 1044 are extracted from the cells 1042 to determine whether the feature 1044 is an object (e.g., a vehicle 120/130). Each feature 1044 within a respective cell 1042 can be identified as having up to four parameters: range, Doppler, azimuth, and elevation. This is called a RF ranging frame. As an example, a feature 1044 within a cell 1042 may be the signal-to-noise ratio (SNR) computed by a constant false alarm rate (CFAR) algorithm. However, it should be understood that other methods may be used to target and identify features 1044 within a cell 1042.

The processor(s) may generate 2-dimensional (2D), 3-dimensional (3D), or four dimensional (4D) tensors for features 1044 within cells 1042 of the observation grid 1040 detected by the RF ranging source 1014. Specifically, a 2D tensor represents the range (i.e., distance from the RF ranging source (e.g., 100) to the detected feature 1044) and azimuth (the horizontal distance between a feature 1044 and a reference RF ray emitted by the RF ranging source 1014, such as the initial RF ray of a RF ranging sweep) of each detected feature 1044. A 3D tensor represents the range, azimuth, and Doppler (indicating the speed of the detected feature 1044) or elevation (vertical direction from the RF ranging source 1014 to the detected feature) of each detected feature 1044. A 4D tensor represents all four quantities. The processor(s) may then perform object detection, object classification, localization, and property/attribute estimation based on the tensors and, in some cases, undistorted camera frames received from the camera 1112.

Figure 11:
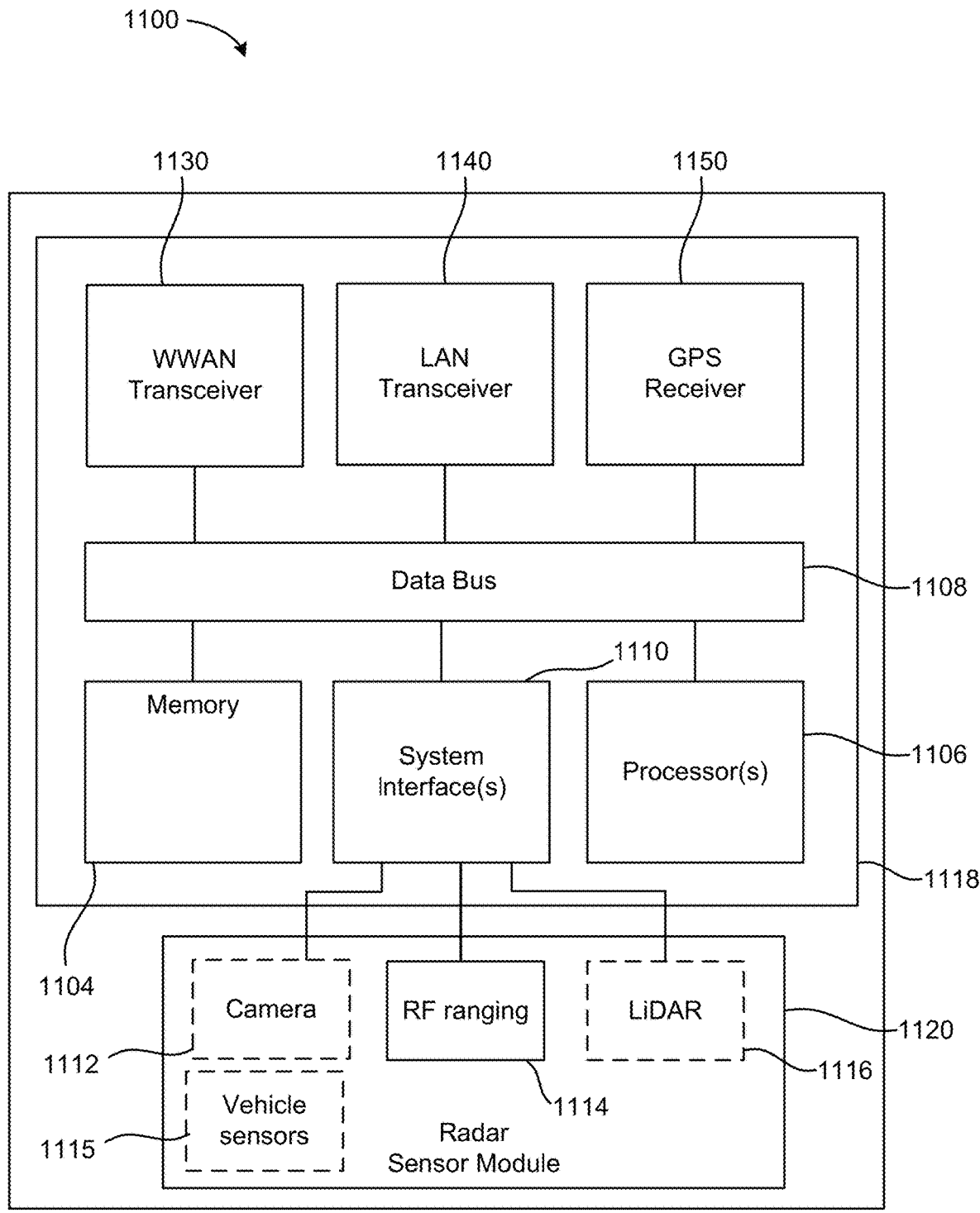
FIG. 11 shows an example illustration of an on-board computer architecture of a RF ranging source, according to some aspects of the disclosure.

FIG. 11 illustrates an on-board computer (OBC) 1100 of a RF ranging source such as ego RF ranging source, according to some aspects of the disclosure. In an aspect, the OBC 1100 includes a non-transitory computer-readable storage medium, i.e., memory 1104, and one or more processors 1106 in communication with the memory 1104 via a data bus 1108. The memory 1104 includes one or more storage modules storing computer-readable instructions executable by the processor(s) 1106 to perform the functions of the OBC 1100 described herein. For example, the processor(s) 1106 in conjunction with the memory 1104 may implement the various operations described herein.

In some aspects, one or more RF ranging sensor modules 1120 are coupled to the OBC 1100 (only one is shown in FIG. 11 for simplicity). In some aspects, the RF ranging sensor module 1120 includes an optional camera 1112, at least one RF ranging module 1114, and an optional light detection and ranging (LiDAR) sensor 1116. The OBC 1100 also includes one or more system interfaces 1110 connecting the processor(s) 1106, by way of the data bus 1108, to the RF ranging sensor module 1120 and, optionally, other vehicle sub-systems (not shown).

The OBC 1100 further includes one or more vehicle sensors 1115, which may include an inertial measurement unit (IMU) configured to obtain IMU data, a wheel tick/odometer sensor configured to obtain wheel tick/odometer data, a velocity sensor configured to obtain velocity data, and/or any other suitable type of inertial or positional sensor configured to obtain vehicle motion and/or position-related data. The IMU may include, for example, an accelerometer, such as a 3D accelerometer, and/or a gyroscope. In some aspects, the OBC 1100 may be configured to use the vehicle sensor data, such as accelerometer data, gyroscope data, wheel tick data, and/or odometer data, in combination with the RF ranging data to generate a local RF ranging signature and/or to assist with RF ranging localization. In some aspects, the OBC 1100 may cross-reference the vehicle sensor data with the RF ranging data to confirm, enhance, modify, and/or otherwise process the RF ranging data for RF ranging map generation and/or RF ranging localization.

The OBC 1100 also includes, at least in some cases, a wireless wide area network (WWAN) transceiver 1130 configured to communicate via one or more wireless communication networks (not shown), such as an NR network, an LTE network, a Global System for Mobile communication (GSM) network, and/or the like. The WWAN transceiver 430 may be connected to one or more antennas (not shown) for communicating with other network nodes, such as other vehicle, pedestrian devices, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceiver 1130 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 1100 also includes, at least in some cases, a wireless local area network (WLAN) transceiver 1140. The WLAN transceiver 1140 may be connected to one or more antennas (not shown) for communicating with other network nodes, such as other RF ranging source (e.g., RF ranging systems of other vehicles), pedestrian UEs, infrastructure access points, RSUs, etc., via at least one designated RAT (e.g., cellular vehicle-to-everything (C-V2X), IEEE 1102.11p (also known as wireless access for vehicular environments (WAVE)), dedicated short-range communication (DSRC), etc.) over a wireless communication medium of interest. The WLAN transceiver 1140 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 1100 also includes, at least in some cases, a global positioning systems (GPS) receiver 1150. The GPS receiver 1150 may be connected to one or more antennas (not shown) for receiving satellite signals. The GPS receiver 1150 may comprise any suitable hardware and/or software for receiving and processing GPS signals. The GPS receiver 450 requests information and operations as appropriate from the other systems, and performs the calculations necessary to determine a RF ranging source's position using measurements obtained by any suitable GPS algorithm.

The OBC 1100 may be used to perform the actions of the schemes, methods, pipelines, or other aspects of FIGS. 2-8 and 13-15, for example. In this regard, one or more of the modules described above, including the scan collecting module, the local signature module, the batching module, the dynamic object recognition module, the dynamic object triangulation module, the image collection module, the point tagging module, the matching module, and/or any other module, may include one or more components of the OBC 1100, such as the processor(s) 1106, the memory 1104, the system interface(s) 1110, and/or the RF ranging sensor module 1114.

Figure 12:
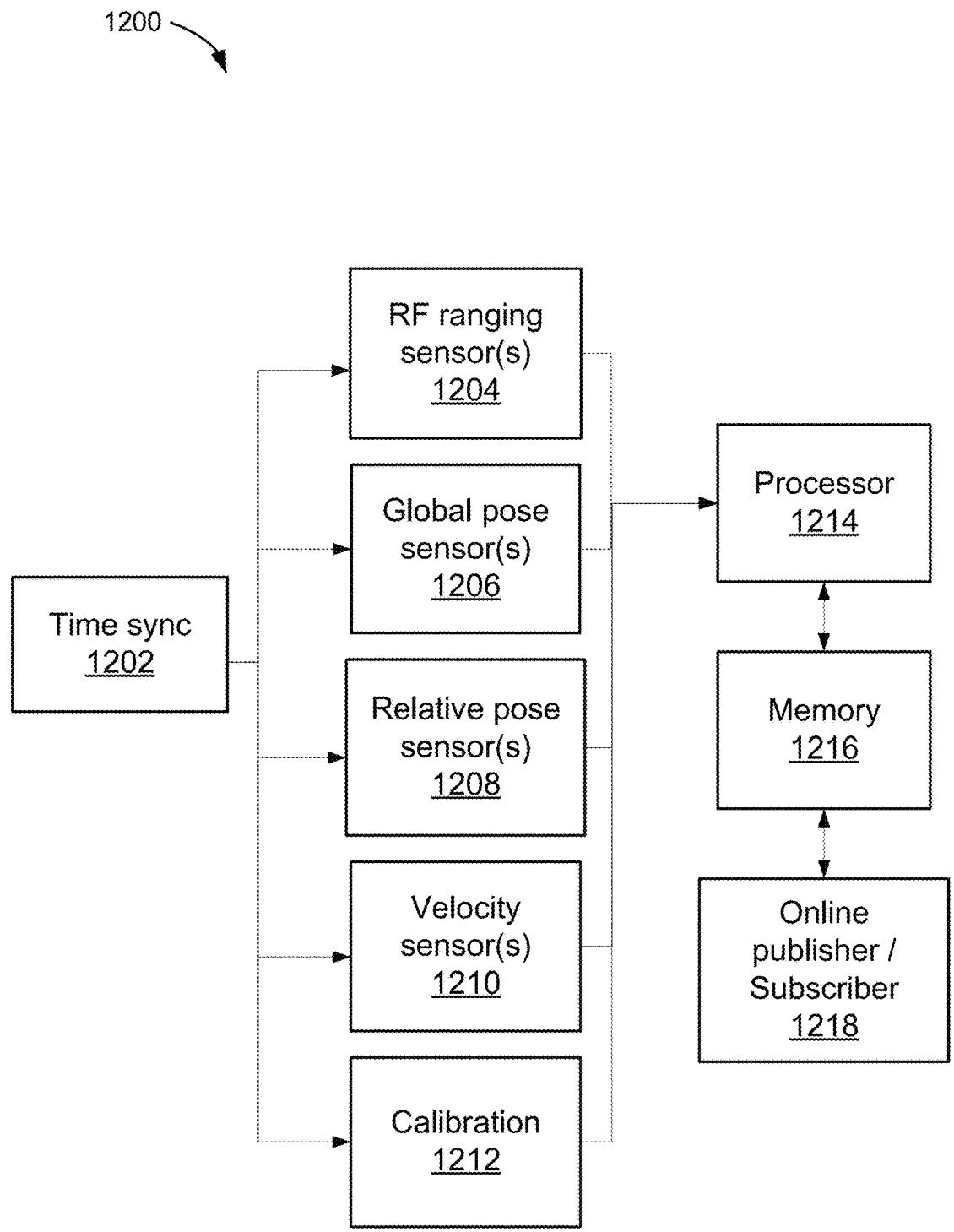
FIG. 12 shows an example block diagram illustrating an apparatus for RF ranging localization and crowdsource-based mapping, according to various aspects of the disclosure.

FIG. 12 is an example block diagram illustrating an apparatus 1200 for RF ranging localization and crowdsource-based RF ranging mapping, according to some aspects of the present disclosure. In some aspects, the apparatus 1200 illustrated in FIG. 12 may be installed in an ego vehicle configured to generate crowdsourced RF ranging maps, and/or to perform localization using RF ranging data. The apparatus 1200 of FIG. 12 may include one or more components of the OBC 1100 illustrated in FIG. 12, for example. It will be understood that the various sensors and modules of the apparatus 1200 may include hardware, software, or a combination thereof. The apparatus 1200 may be used to perform the actions of the schemes, methods, pipelines, or other aspects of FIGS. 2-8 and 13-15, for example.

The apparatus 1200 in FIG. 12 includes at least one RF ranging sensor 1204 capable of providing timestamped target detections in 2D/3D space with respect to the RF ranging coordinate frame, and a Doppler velocity estimate of the targets. In some aspects, the RF ranging sensor(s) 1204 may be capable of providing meta information about the targets including indicators that help identify false targets like RF ranging cross section (RCS) or signal to noise ratio (SNR) or potential multipath ghost target, etc. The RF ranging sensor(s) could also be potentially capable of providing error statistics reported by the RF ranging on the estimated accuracy of the 2D targets. The RF ranging sensor 1204 may be configured to operate at mmWave or sub-terahertz with one or more giga-hertz (GHz) of bandwidth to enable accurate ranging. The RF ranging could be a high-resolution RF ranging with azimuth angular resolution of sub-1 degree. The RF ranging may or may not have elevation capability. The RF ranging sensor 1204 may have multiple scan modes of operation for detecting targets at different ranges. In some aspects, data from all scan modes can appropriately combined with a common timestamp by the time sync module 1202 before feeding into the RF ranging localization modules described herein. One method of appropriately combining may be selecting one of the scan modes. Another method may include using a union of detections from the multiple scan modes.

In some aspects, the apparatus 1200 includes one or more global pose sensors 1206 configured to provide vehicle pose and ego velocity in a global reference frame, like the earth-centered earth-fixed (ECEF) frame. This could be a GNSS or GPS sensor. The apparatus 1200 may further include a separate set of relative pose sensors 1208 that can provide accurate relative pose change for a short span (e.g., 5 milliseconds, 200 milliseconds, 500 milliseconds, 1 second, 2 seconds, 5 seconds, 12 seconds, etc.) when the vehicle is running. Relative pose determination may be enabled through sensor fusion from multiple sensors including imaging sensors (camera, LIDAR, wheel odometry system, inertial measurement unit (IMU) system, etc.) In some aspects, the apparatus 1200 may use global pose sensors 1206 and no separate relative pose sensors 1208. The apparatus further includes one or more velocity sensors 1210 configured to provide ego speed in online mode when the vehicle is driving. For instance, the velocity sensors 1210 may be coupled to a velocity module such as a wheel odometry system or an inertial measurement unit (IMU) or a sensor fusion of these along with other sensors.

The apparatus 1200 further includes a calibration module 1212 configured to provide vehicle calibration information. The calibration module 1212 and calibration may facilitation the transformation from the RF ranging coordinate frame to a body frame (like the rear axle frame). This may also facilitate the RF ranging detections with vehicle pose information, which may be reported at a different body frame than the RF ranging frame. The apparatus may include the time sync module 1202 that can synchronize the clocks across the modules and components of the apparatus 1200. The apparatus 1200 may further include at least one processor 1214 and a memory module 1216. The processor is configured to receive one or more of the inputs from the sensors and modules described above to process the data and store the raw or processed data from the modules into the memory module 1216. The apparatus further includes a publishing module 1218 configured to facilitate communication with external world, i.e., outside the ego vehicle. An exemplary publishing module 1218 may include a transceiver configured to communicate information over a wireless network and/or subscribing incoming information from a wireless network. For example, the publishing module 1218 may include a wireless transceiver, and may be configured to communicate with other vehicles and/or with the server via a network using fourth-generation long-term evolution (LTE), fifth generation new radio (5G NR), sidelink communications, vehicle-to-vehicle (V2V), vehicle-to-everything (V2X), and/or any other suitable type of communication.

In some aspects, the quantity and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
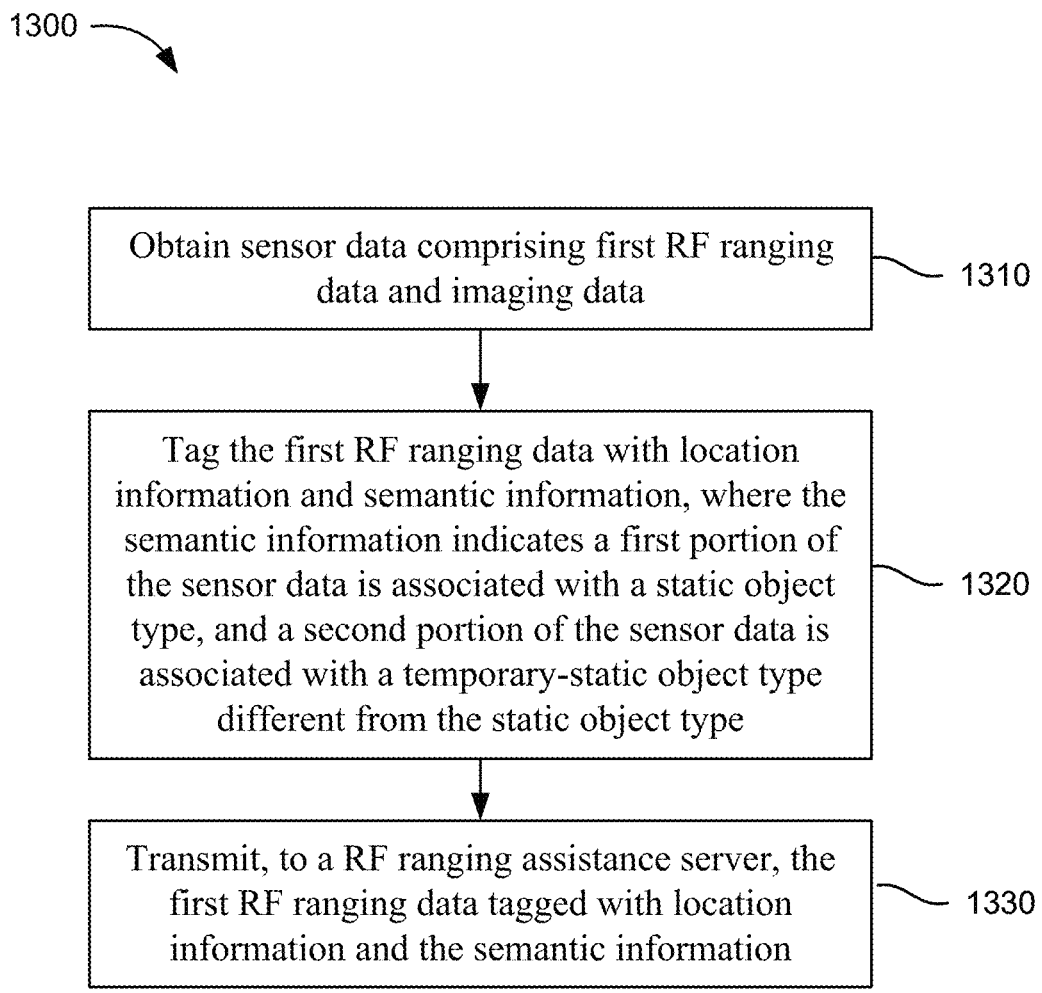
FIG. 13 shows an example block diagram illustrating a user equipment (UE) for use us a vehicle-to-everything (V2X) communication scheme, according to various aspects of the disclosure.

FIG. 13 shows an example flow diagram of a method of RADAR localization and mapping, performed by a user equipment (UE) according to various aspects of the disclosure. The UE may include the apparatus 1200. The UE may include an OBC, such as the OBC 1100, in some aspects. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, the UE obtains sensor data comprising first RF ranging data and imaging data. In some aspects, block 1310 includes obtaining radio detection and ranging (RADAR) measurements. In other aspects, block 1310 may include obtaining fifth-generation (5G) signal data, WiFi™ signal data, ultra-wideband (UWB) signal data, long-term evolution (LTE) data, millimeter wave data, and/or any other suitable type of RF data. The UE may include, or be coupled to, an ego vehicle comprising the apparatus 1200, including a RF ranging sensor, one or more local pose sensors, and/or one or more global pose sensors. The UE may obtain the RF ranging data periodically by radially scanning a scene. The UE may use transmit- and/or receive-beamforming with an array of antenna elements to perform the scanning. In some aspects, the UE may obtain several RF ranging scans each second. The UE may obtain the RF ranging data such that the RF ranging data is timestamped.

At block 1320, the UE tags the first RF ranging data with location information and semantic information. In some aspects, the UE may be equipped with a global positioning sensor (e.g., GNSS, GPS, etc.). The RF ranging data may be tagged with at least a coarse location based on the global positioning sensor data that is temporally related to the first RF ranging data. In some aspects, the semantic information is based on the RF ranging data and/or imaging data corresponding to the RF ranging data. For example, in some aspects, the UE may be coupled to or associated with one or more imaging sensors configured to obtain imaging data of the scene. The imaging data may be tagged with the location information with which the RF ranging data is tagged. In some aspects, the UE is configured to determine, generate, and/or otherwise obtain the semantic information by analyzing at least one of the imaging data or the RF ranging data. In some aspects, the semantic information indicates a first portion of the RF ranging data is associated with a static object type, and a second portion of the RF ranging data is associated with a temporary-static object type. The temporary-static object type may be different from the static object type. In some aspects, the temporary-static object type may be referred to as a pseudo-static object type. As explained above, the temporary-static object type may refer to objects which are not in motion at the time the RF ranging data and/or imaging data are obtained, but may be more likely to be moved from their respective locations in the near future. Examples of temporary-static objects include parked cars, construction signage, temporary construction barriers, temporary event barriers, traffic cones, trailers, offloaded cargo or goods, food trucks, and/or any other temporary-static object which may be likely to move.

In some aspects, the imaging data may include digital camera image data, light detection and ranging (LIDAR) data, or both. In some aspects, the UE is configured to determine the semantic information by analyzing the imaging data. For example, the UE may be configured to identify shapes or other structures associated with a static type and/or a temporary-static type. In some aspects, the UE may employ a bounding box to identify objects associated with the temporary-static type, such as parked cars, construction signage, traffic cones, etc. In some aspects, the UE may use a combination or fusion of the imaging data and the RF ranging data to identify the temporary-static objects. For example, the UE may determine, based on the RF ranging data, whether one or more objects in the scene are in motion. For example, the UE may determine whether objects are in motion by determining whether a RF ranging data point is associated with a frequency shift. The UE may ignore and/or otherwise discard the RF ranging data determined to be in motion. The remaining RF ranging data may be assumed to be associated with the static object type unless the UE determines that one or more portions of the RF ranging data correspond to temporary-static objects. In that case, the UE may tag, discard, or otherwise apply an indicator to the portions of the RF ranging data (e.g., the second portion) that are associated with the temporary-static object type.

In some aspects, the location information may be obtained by one or more global and/or local pose sensors of the UE. For example, the UE may include a satellite-based pose sensor (e.g., GPS, GNSS, etc.), a global reference sensor, a camera system, a LIDAR imaging system, an ultrasonic SONAR system, and/or any other suitable type of sensor or sensing system. In some aspects, the UE may generate a local signature using the RADAR measurements and local pose data. In some aspects, the UE also time stamps the location information such that the location information is temporally correlated with the RADAR measurements. The location information may include pose information determined by the UE, or a server, where the pose information is determined with a fusion of sensor data (e.g., wheel tick/ odometer, vehicle velocity, camera data, GPS data, LIDAR data, etc.). In some aspects, the UE may receive or obtain vehicle sensor data from one or more vehicle sensors. The vehicle sensors may include an inertial measurement unit (IMU) configured to obtain IMU data, a wheel tick/odometer sensor configured to obtain wheel tick/odometer data, a velocity sensor configured to obtain velocity data, and/or any other suitable type of sensor configured to obtain vehicle position-related data. The IMU may include, for example, an accelerometer, such as a 3D accelerometer, and/or a gyroscope.

In some aspects, tagging the semantic information to the RF information involves or includes determining a location of temporary-static objects in the scene. In some aspects, the distance to the temporary-static objects in the scene may be coarsely estimated by successively tracking multiple instances of the objects on camera images and triangulating using vehicle pose information, velocity information, and/or other position-related data. Based on the coarse global location of the UE and the coarse relative position information of the temporary-static objects, a coarse global position of the temporary-static objects may be determined. In some aspects, the UE may remove or discard RF ranging data associated with the temporary-static object type. In other aspects, the UE may tag the first RF ranging data with the semantic information for publishing to the RF ranging assistance server, as explained further.

At block 1330, the UE transmits, to a RF ranging assistance server, the first RF ranging data tagged with the location information and the semantic information. In some aspects, the UE may be coupled to or otherwise associated with a motor vehicle. The transmitting the first RF ranging data may include transmitting the first RF ranging data via a wide area network (WAN) while the motor vehicle is in motion. In other aspects, the UE comprises a memory device, and the UE is configured to store the first RF ranging data tagged with the location information and the semantic information on the memory device. The UE may be configured to transmit the first RF ranging data to the RF ranging assistance server via a local area network (LAN) in response to connecting to the UE connecting to the LAN. For example, the UE may be configured to store the first RF ranging data, imaging data, location data, and/or semantic information and may upload the data to the RF ranging assistance server in response to connecting to a home WiFi network, for example.

In some aspects, the method 1300 may include receiving the location-tagged RF ranging assistance data from the RF ranging assistance server. In some aspects, the location-tagged RF ranging assistance data is based on RF ranging assistance data, imaging data, vehicle pose information, and/or other types of data obtained from a plurality of UEs different from the UE. In this regard, the RF ranging assistance data may include crowdsourced RF-based mapping data, such as a RF point cloud. In another aspects, the RF-based mapping data may include a RF map. In some aspects, the RF ranging assistance data comprises semantic information indicating that at least a portion of the RF ranging assistance data is associated with a temporary-static type. The UE may be configured to use the semantic information in conjunction with a matching algorithm and/or matching module for RF-based localization and navigation. For example, when attempting to match a RF local signature with the RF ranging assistance data, the UE may apply less weight to RF ranging assistance data points associated with the temporary-static object type, as they are more likely to have moved since the RF ranging assistance data was compiled by the server and published to the UEs.

In some aspects, the method 1300 may further include receiving, based on further RF ranging assistance data obtained by the UE, updated location-tagged RF ranging assistance data. The updated RF ranging assistance data may be based on the location-tagged RF ranging assistance data, the first RF ranging data, and the semantic information. For example, as explained further below, the RF ranging assistance server may be configured to update the RF ranging assistance data based on new RF ranging data, imaging data, and other position and mapping-related data obtained by the UE and/or one or more other UEs.

In some aspects, the transmitting the location-tagged RF ranging data and semantic information may be based on a trigger event, trigger signal, or other event. For example, in some aspects, the RF ranging assistance server may transmit, to the UE, a message indicating the UE to transmit the RF ranging data and/or semantic data. In another aspect, the mapping flag state (ON/OFF) may be based on geographical location, weather conditions, accuracy or quality score of the sensor data, a server broadcast message, or any other suitable parameter.

In some aspects, the RF ranging assistance server may compare updated RF ranging data and/or semantic information to the existing RF ranging assistance data. In some aspects, based on the comparison, the RF ranging assistance server may determine whether to update the RF ranging assistance data, or discard the previous RF ranging assistance data and generate or compile new RF ranging assistance data. For example, if the newly obtained RF ranging data from the UE is significantly different from the previously existing RF ranging assistance data, the RF ranging assistance server may determine to discard the previous RF ranging assistance data and build new RF ranging assistance data, such as a RF ranging map, RF ranging point cloud, and/or any other suitable RF ranging assistance data.

In some aspects, the transmitting the first RF ranging data and the semantic information may be based on data quality information associated with the first RF ranging data. For example, the UE may be configured to determine and error rate and/or any other suitable data quality metric for the first RF ranging data, the imaging data, and/or any other position-related data obtained by the UE. If the data quality information indicates poor data quality, the UE may refrain from transmitting the first RF ranging data and/or the semantic information to the RF ranging assistance server. In some aspects, the UE may be configured with a data quality threshold which can be compared to the RF ranging data, the imaging data, the pose data, and/or any other position-related data obtained by the UE. in some aspects, the UE is configured to tag the first RF ranging data with the data quality information, and transmit the RF ranging data with the tagged data quality information to the RF ranging assistance server.

In another aspect, the UE is configured to obtain pose, velocity, and/or any other suitable location or motion related data associated with the UE. For example, the UE may include, be coupled to, or otherwise associated with, a wheel odometry system, and inertial measurement unit, a compass, a global positioning sensor, and/or any other suitable type of pose sensor.

In another aspect, the UE may be configured to determine, based on the first RF ranging data, the semantic information. For example, the UE may be configured to use artificial intelligence, or machine learning to identify static objects, temporary-static objects, dynamic objects, and/or any other relevant type of object. In some aspects, the UE may be configured with a machine learning or deep learning module comprising a combination of hardware and software modules, where the machine learning or deep learning module is configured to identify shapes, patterns, or other structures in the first RF ranging data associated with a static object type, a temporary-static object type, and/or a dynamic object type. For example, the method 1300 may employ or involve aspects of FIG. 10. For example, that UE may be configured to determine, based on machine learning of the first RF ranging data, that at least a portion of the first RF ranging data corresponds to a guardrail structure, and overhead bridge, and overhead sign, foliage, and/or any other suitable static object. In another aspect, the UE may be configured to determine, based on the RF ranging data, whether an object is a temporary-static object, such as a parked car, construction signage, a trailer, etc.

According to another aspect, the UE may be configured to identify one or more navigational boundaries based on the first RF ranging data. For example, the UE may determine or identify a first navigational boundary associated with the first portion of the first RF ranging data. The UE may be configured to generate or obtain semantic information indicating that the first portion of the first RF ranging data is associated with the navigational boundary, which may be a static object type. In some aspects, the navigational boundary identified by the UE may not be present in the RF ranging assistance data provided by the RF ranging assistance server. Accordingly, the UE may transmit the first RF ranging data tagged with the semantic information such that the RF ranging assistance server may update or otherwise modify the RF ranging assistance data.

Figure 14:
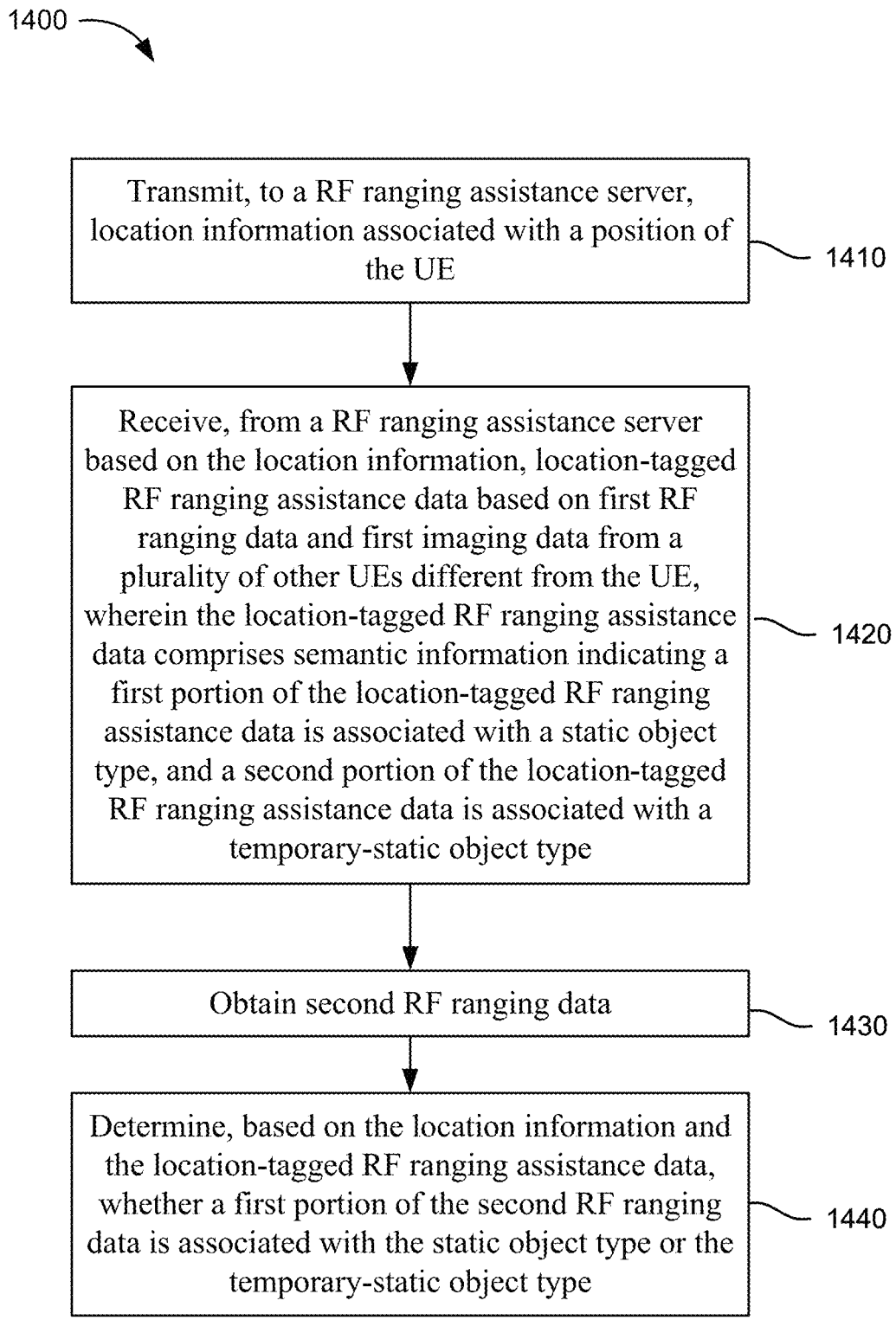
FIG. 14 shows an example flow diagram of a method of RF ranging localization and mapping, according to various aspects of the disclosure.

FIG. 14 shows an example flow diagram of a method of RADAR localization and mapping, performed by a user equipment (UE) according to various aspects of the disclosure. The UE may include the apparatus 1200. The UE may include an OBC, such as the OBC 1100, in some aspects. As illustrated, the method 1400 includes a number of enumerated steps, but aspects of the method 1400 may include additional steps before, after, and in between the enumerated steps. In some aspects, one or more of the enumerated steps may be omitted or performed in a different order. In some aspects, the method 1400 may be used by a UE4 RF ranging based localization and guidance. For example, the UE may be equipped only with RF ranging sensors for navigation. In another example, the UE may be equipped with multiple types of sensors, including imaging sensors, but the current conditions (e.g., weather, time of day) may result in the imaging data being less useful or impracticable. Accordingly, the method 1400 may include using RF ranging assistance or mapping data provided by a network or server to auto locate and determine the location and heading of the UE with respect to the RF ranging assistance data.

At block 1410, the UE transmits, to a RF ranging assistance server, location information associated with the position of the UE. For example, the UE may include, be coupled to, or otherwise be associated with a position sensor, such as a satellite-based position sensor (e.g., GPS, GNSS, etc.). the UE may be configured to obtain periodic timestamped location measurements indicating a coordinate of the UE. In some aspects, the location information transmitted by the UE may be coarse location information. For example, the UE may be located in a mountainous region or in an urban environment which reduces the signal strength and weakens the connection between the UE and a satellite based position sensor. Accordingly, the RF ranging assistance server may consider the location information provided by the UE as coarse. For instance, the RF ranging assistance server may consider the location information associated with the position of the UE to be accurate within several meters, several tens of meters, 100 meters, several hundreds of meters, or one or more kilometers.

At block 1420, the UE may receive, from the RF ranging assistance server based on the location information provided at block 1410, location-tagged RF ranging assistance data. The RF ranging assistance data may be based on first RF ranging data and first imaging data from a plurality of other UE's different from the UE. In some aspects, the location-tagged RF ranging assistance data may include semantic information indicating a first portion of the location-tagged RF ranging assistance data is associated with a static object type. The semantic information may further indicate that a second portion of the location-tagged RF ranging assistance data is associated with a temporary-static object type. As explained above, the temporary-static object type may refer to objects which are motionless or stationary at the time the RF ranging data is obtained, but are likely to move in the near future. In some aspects, the RF ranging assistance data may include a RF ranging point cloud representing points in a 2-dimensional or 3-dimensional space. In other aspects, the RF ranging assistance data may include a RF ranging map. The semantic information may include metadata or other data associated with each point or location on the map indicating whether the point is a static object, a temporary-static object, and/or a dynamic object. In some aspects, the RF ranging assistance data may remove all dynamic objects. In some aspects, the semantic information may include an indication of a likelihood that each respective portion of the RF ranging assistance data is a temporary-static object or a static object. For example, the UE may be configured to apply different weights in a matching algorithm based on the likelihood that an object is a temporary-static object. For example, the UE may be configured to apply a lower weight to data points that are indicated to be more likely to be temporary-static as opposed to static. Similarly, the UE may be configured to apply a higher weight to data points that are indicated to be less likely to be a temporary-static object.

At block 1430, the UE obtains second RF ranging data. For example, the UE may be coupled to or otherwise associated with a RF ranging sensor configured to obtain the second RF ranching data. The RF ranging data may be 2-dimensional RF ranging data or 3-dimensional RF ranging data. In some aspects, obtaining the second RF ranging data may include timestamping and/or location tagging the second RF ranging data with the coarse location information. In some aspects, the second RF ranging data may correspond to a location represented in the first RF ranging assistance data provided by the RF ranging assistance server. In some aspects, the UE may use the second RF ranging data and the RF ranging assistance data for RF ranging localization.

At block 1440, the UE determines, based on the position of the UE and the location-tagged RF ranging assistance data, whether a first portion of the second RF ranging data is associated with the static object type or the temporary-static object type. In some aspects, the UE comprises a matching module configured to perform a matching algorithm to compare the second RF ranging data with the RF ranging assistance data. In some aspects, the determining whether the first portion of the second RF ranging data is the static object type or the temporary-static object type comprises comparing a local RF ranging signature to the RF ranging assistance data. In this regard, the UE may be configured to generate the RF ranging local signature by batching RF ranging scans and combining the RF ranging scans with pose and/or velocity information to periodically produce the local RF ranging signature over a period of time. In some aspects, the period of time may be one or more milliseconds. In another aspect, the period of time may be one or more seconds. In some aspects, the matching algorithm may be a scan to map algorithm. In another aspect, the matching algorithm may include a map to map algorithm.

In some aspects, the UE is configured to determine, based on the second RF ranging data and the RF ranging assistance data, a refined global location of the UE. For example, based on the matching algorithm, the UE may determine or calculate a more precise location and orientation of the motor vehicle in the global domain. In some aspects, the UE may be configured to update a route of travel based on the second RF ranging data. For example, the method 1400 may include the UE determining, based on the RF ranging assistance data, a first round of travel, and determining, based on the second RF ranging data, a second route of travel. In another aspect, the UE may be configured to obtain second imaging data associated with the location of an object in the field of view. The second RF ranging data may include a second portion associated with the location of the object in the field of view. The method 1400 may further include determining, based on a comparison of the second portion of the second RF ranging data and the second imaging data, weather to adjust a heading of the motor vehicle to avoid the location of the object in the field of view.

In some aspects, the matching algorithm may include or involve a likelihood field approach. The likelihood field approach may involve maximizing a metric associated with a batch RF ranging scan, pose information, and a RF ranging assistance map. In some aspects, the matching algorithm may employ a similarity metric, such as a sum squared difference or a correlation metric to give a matching score between the RF ranging local signature and the RF ranging assistance data. In some aspects, the location information transmitted at block 1410 may be used to select the portion of the RF ranging assistance data for matching For example, based on the coarse location information provided at block 1410, the UE may be configured to select a portion of the RF ranging assistance data corresponding to the coarse location and a radius around the coarse location. In some aspects, the similarity metric computation may employ the semantic information indicated in the RF ranging assistance data.

the UE measures sensor data comprising radio detection and ranging (RADAR) measurements. The UE may include an ego vehicle comprising the apparatus 1000, including a RADAR sensor, one or more local pose sensors, and/or one or more global pose sensors. The UE may obtain the RADAR measurements periodically by radially scanning a scene. The UE may use transmit and/or receive beamforming of an array of antenna elements to perform the scanning. In some aspects, the UE may obtain several RADAR scans each second. The UE may obtain the RADAR measurements such that the RADAR measurements are timestamped.

In other aspects, the server may be configured to use the vehicle sensor data, such as accelerometer data, gyroscope data, wheel tick data, and/or odometer data, in combination with the RADAR data to generate a local RADAR signature and/or to assist with RADAR localization. In some aspects, the UE and/or the server may cross-reference the vehicle sensor data with the RADAR data to confirm, enhance, modify, and/or otherwise process the RADAR data for RADAR map generation and/or RADAR localization. For example, if the UE and/or the server identifies an unexpected object or shift in the RADAR data, the UE and/or the server may check the vehicle sensor data (e.g., IMU data, wheel odometer data) for changes in direction or orientation that may account for the unexpected object or shift.

In some aspects, the UE may receive or obtain vehicle sensor data from one or more vehicle sensors. The vehicle sensors may include an inertial measurement unit (IMU) configured to obtain IMU data, a wheel tick/odometer sensor configured to obtain wheel tick/odometer data, a velocity sensor configured to obtain velocity data, and/or any other suitable type of sensor configured to obtain vehicle position-related data. The IMU may include, for example, an accelerometer, such as a 3D accelerometer, and/or a gyroscope. In some aspects, the UE may be configured to use the vehicle sensor data, such as accelerometer data, gyroscope data, wheel tick data, and/or odometer data, in combination with the RADAR data to generate a local RADAR signature and/or to assist with RADAR localization. In other aspects, the server may be configured to use the vehicle sensor data, such as accelerometer data, gyroscope data, wheel tick data, and/or odometer data, in combination with the RADAR data to generate a local RADAR signature and/or to assist with RADAR localization. In some aspects, the UE and/or the server may cross-reference the vehicle sensor data with the RADAR data to confirm, enhance, modify, and/or otherwise process the RADAR data for RADAR map generation and/or RADAR localization. For example, if the UE and/or the server identifies an unexpected object or shift in the RADAR data, the UE and/or the server may check the vehicle sensor data (e.g., IMU data, wheel odometer data) for changes in direction or orientation that may account for the unexpected object or shift.

Figure 15:
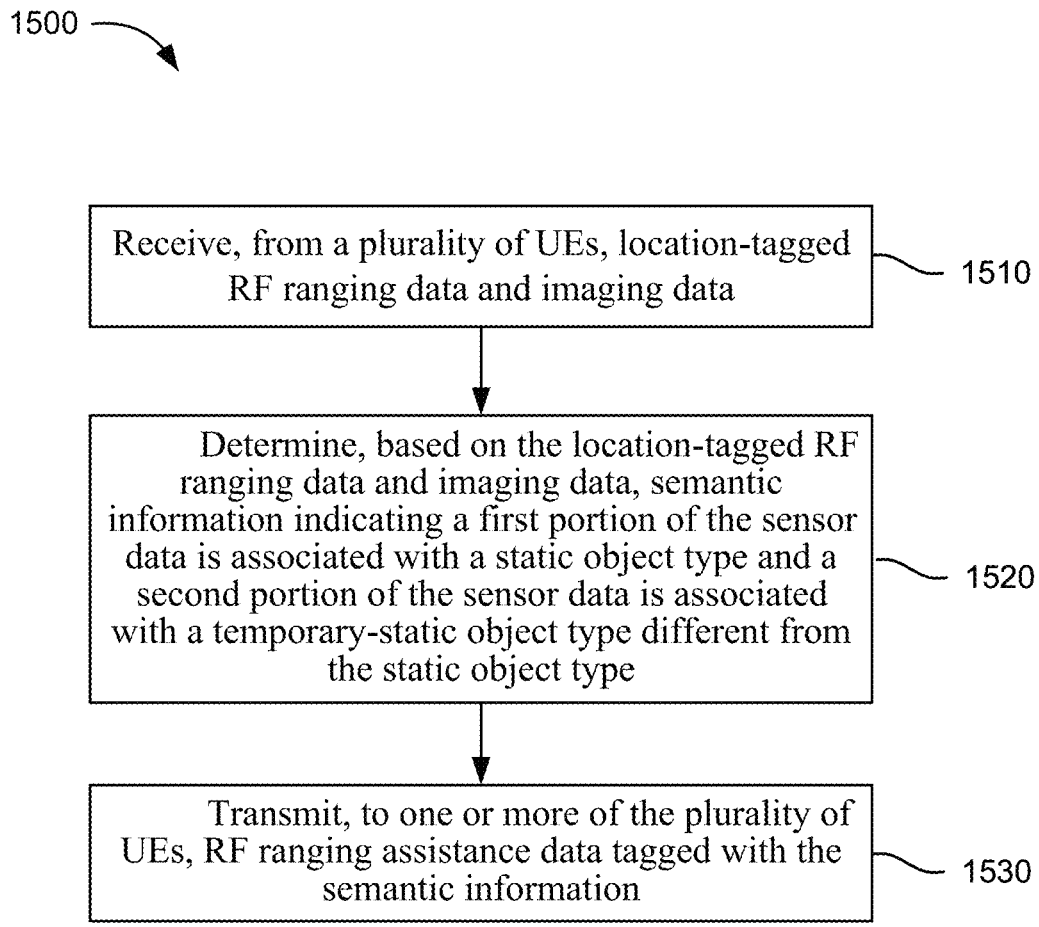
FIG. 15 shows an example flow diagram of a method of crowdsourced RF ranging mapping, according to various aspects of the disclosure.

FIG. 15 shows an example flow diagram of a method of RADAR localization and mapping, performed by a RF ranging assistance server according to various aspects of the disclosure. The server may include a computing device having a processor, a memory, and a wireless transceiver. In this regard, the server may include components similar to the OBC 1100, such as the WWAN transceiver 930, the LAN transceiver 940, the memory 904, and the processor(s) 906. As illustrated, the method 1500 includes a number of enumerated steps, but aspects of the method 1500 may include additional steps before, after, and in between the enumerated steps. In some aspects, one or more of the enumerated steps may be omitted or performed in a different order.

At block 1510, the server receives, from a plurality of UEs, location-tagged RF ranging data. In some aspects, the location-tagged RF ranging data may include RADAR data, Wi-Fi signal data, LTE signal data, 5G signal data, UWB signal data, and/or any other suitable type of RF ranging data. The RF ranging data may be tagged with location information, such as GPS data, GNSS data, pose data, heading, wheel odometer, velocity, and/or any other suitable type of location information. in some aspects, the location information may further include geometrical information corresponding to the UE. For example, the location information may include vehicle information indicating a type, make, model, size, and/or any other relevant parameter of the motor vehicle associated with the UE.

At block 1520, the RF ranging assistance server determines, based on the location-tagged RF ranging data and imaging data, semantic information indicating a first portion of the RF ranging data is associated with a static object type and a second portion of the RF ranging data is associated with a temporary-static object type. In some aspects, the RF ranging assistance server is configured to analyze the imaging data to identify shapes, patterns, or other structures in the imaging data associated with temporary-static objects. In some aspects, the RF ranging assistance server is configured to use a combination of the imaging data and the RF ranging data to determine and object type associated with each portion of the RF ranging data. In some aspects, the RF ranging assistance server uses the location information tagged with the RF ranging data and received at block 1510 to correlate the RF ranging data with the imaging data. Some aspects, the RF ranging assistance server may further use vehicle pose data, such as coarse position data, heading, vehicle pose, wheel odometry data, and/or any other suitable type of location information to determine the global positions of each portion of the RF ranging data and the imaging data.

In some aspects, based on the determination of the semantic information, the RF ranging assistance server is configured to tag RF ranging assistance data with the semantic information. In other aspects, the RF ranging assistance server may be configured to discard or otherwise remove or ignore portions of the RF ranging assistance data based on the semantic information. For example, the RF ranging assistance server may be configured to remove portions or objects from the RF ranging assistance data that are associated with the temporary-static object type. In other aspects, the RF ranging assistance server may be configured to employ or apply a timer for temporary-static objects, such that temporary-static objects in the RF ranging assistance data may be removed after a period of time. In another aspect, the semantic information may include a timestamp for static objects and/or temporary-static objects. Accordingly, the UEs receiving the RF ranging assistance data may be configured to discard, ignore, and/or weight the RF ranging assistance data corresponding to temporary-static objects.

In another example, the RF ranging assistance server may be configured to employ artificial intelligence or machine learning mechanisms to identify different object types in the RF ranging data based on the RF ranging data alone. For example, as described above, a machine learning algorithm may be used by the RF ranging assistance server too identify particular shapes, patterns, or other geometric aspects of the RF ranging data to identify static objects and/or temporary-static objects. In one example, the RF ranging assistance server may be configured to retrieve a previously existing RF ranging map for a particular location. Based on new RF ranging data transmitted by a UE in that region, the RF ranging assistance server may identify one or more RF ranging points, blobs, or other portions of RF ranging data that do not exist in the RF ranging assistance map. In some aspects, the RF ranging assistance server may be configured to designate those newly identified structures in the RF ranging data as temporary-static objects or dynamic objects, unless those portions of data are determined by the machine learning algorithm to correspond to static objects. For example, static objects may include highway medians, periodically spaced guardrails, overhead signage, overpasses, street lights, or other static objects that may be identified by the machine learning algorithm.

At block 1530, the RF ranging assistance server transmits, to one or more of the plurality of UEs, RF ranging assistance data tagged with the semantic information. In some aspects, the RF ranging assistance data may include and RF ranging assistance point cloud, where each point in the point cloud is associated with an object type. In some aspects, each point in the point cloud may be associated with a weight indicating a likelihood that the corresponding object is a temporary-static object. In some aspects, the RF ranging assistance data indicates updates to previously transmitted RF ranging assistance data. In other aspects, the RF ranging assistance data comprises a new or fresh map, point cloud, or other RF ranging assistance data that can be used by one or more UEs navigating using RF ranging. In some aspects, based on the determination of block 1520, the RF ranging assistance server may be configured to determine whether to update or modify a previously existing RF ranging map, or discard the previously existing RF ranging map and create or generate a new RF ranging map.

It will be understood that one or more features or aspects of the schemes, methods, mechanisms, devices, and/or systems described herein may be combined with one or more features or aspects of the other schemes, methods, mechanisms devices, and/or systems, described herein. For example, in some aspects, the scheme illustrated in FIG. 1A may include aspects of FIGS. 2-8 and 13-15, and vice versa. Further, the systems and devices may be similarly modified or combined with other systems, devices, and apparatuses described herein. For example, one or more of the vehicles 202, 204, 206 in FIG. 2 may include one or more components of the OBC 1100 and/or the apparatus 1000. Further, one or more components or features of the OBC 1100 may be combined with one or more components or features of the apparatus 1000, and vice versa. The schemes and mechanisms described herein, including those illustrated in FIGS.

2-8 and 13-15, may be performed using one or more of the OBC 1100, the apparatus 1000, and/or a combination thereof. Further still, the server or cloud computing device may comprise one or more computing components similar or identical to the OBC 1100 and/or the apparatus 1000.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

EXEMPLARY ASPECTS OF THE DISCLOSURE

Aspect 1. A method performed by a user equipment (UE), the method comprising: obtaining sensor data comprising first radio frequency (RF) ranging data and imaging data; tagging the first RF ranging data with location information and semantic information, wherein the semantic information is based on the imaging data, and wherein the semantic information indicates a first portion of the RF ranging data is associated with a static object type and a second portion of the RF ranging data is associated with a temporary-static object type different from the static object type; and transmitting, to a RF ranging assistance server, the first RF ranging data tagged with the location information and the semantic information.

Aspect 2. The method of aspect 1, wherein the RF ranging data comprises radio detection and ranging (RADAR) data, fifth-generation (5G) signal data, WiFi signal data, ultra-wideband (UWB) signal data, or a combination thereof.

Aspect 3. The method of any of aspects 1-2, wherein the imaging data comprises digital camera image data, light detection and ranging (LIDAR) data, or both.

Aspect 4. The method of any of aspects 1-3, wherein UE is associated with a motor vehicle, and wherein the transmitting the first RF ranging data comprises transmitting the first RF ranging data via a wide area network (WAN) while the motor vehicle is in motion.

Aspect 5. The method of any of aspects 1-3, wherein the UE is associated with a motor vehicle, wherein the method further comprises: storing, on a memory device of the motor vehicle, the first RF ranging data tagged with the location information and the semantic information, and wherein the transmitting the first RF ranging data comprises transmitting the first RF ranging data via a local area network (LAN) in response to the UE connecting to the LAN.

Aspect 6. The method of any of aspects 1-5, further comprising: receiving, from the RF ranging assistance server, location-tagged RF ranging assistance data based on second RF ranging data, the second RF ranging data being from a plurality of other UEs different from the UE.

Aspect 7. The method of aspect 6, wherein the location-tagged RF ranging assistance data is further based on imaging data from the plurality of other UEs.

Aspect 8. The method of any of aspects 6-7, wherein the location-tagged RF ranging assistance data indicates a first portion of the location-tagged RF ranging assistance data is associated with the static object type and a second portion of the RF ranging assistance data is associated with the temporary-static object type.

Aspect 9. The method of any of aspects 6-8, further comprising: storing, in a memory device of the UE, the location-tagged RF ranging assistance data.

Aspect 10. The method of aspect 9, further comprising: storing, in the memory device, data indicating the first portion of the location-tagged RF ranging assistance data is associated with the static object type.

Aspect 11. The method of any of aspects 6-10, further comprising: receiving, from the RF ranging assistance server, updated location-tagged RF ranging assistance data based on the location-tagged RF ranging assistance data, the first RF ranging data, and the semantic information.

Aspect 12. The method of any of aspects 1-11, further comprising: receiving, from the RF ranging assistance server, a signal requesting the UE to transmit the first RF ranging data tagged with the semantic information, wherein the transmitting the first RF ranging data is based on the receiving the signal.

Aspect 13. The method of any of aspects 1-12, wherein the transmitting the first RF ranging data is based on a confidence level of the sensor data.

Aspect 14. The method of any of aspects 1-13, further comprising: tagging the first RF ranging data with data quality information, wherein the transmitting the first RF ranging data comprises transmitting the first RF ranging data tagged with the data quality information.

Aspect 15. The method of any of aspects 1-14, wherein the sensor data further comprises pose and velocity information associated with the UE.

Aspect 16. The method of any of aspects 1-15, wherein the tagging the first RF ranging data comprises tagging the first RF ranging data with a timestamp.

Aspect 17. The method of any of aspects 1-16, further comprising: determining, using machine learning and based on the first RF ranging data, the semantic information.

Aspect 18. The method of any of aspects 1-17, further comprising: identifying, based on the first RF ranging data, a navigational boundary, wherein the semantic information comprises an indication of a location of the navigational boundary.

Aspect 19. A method performed by a user equipment (UE), the method comprising: transmitting, to a radio frequency (RF) ranging assistance server, location information associated with a position of the UE; receiving, from a RF ranging assistance server based on the location information, location-tagged RF ranging assistance data based on first RF ranging data and first imaging data from a plurality of other UEs different from the UE, wherein the location-tagged RF ranging assistance data comprises semantic information indicating a first portion of the location-tagged RF ranging assistance data is associated with a static object type, and a second portion of the location-tagged RF ranging assistance data is associated with a temporary-static object type; obtaining second RF ranging data; and determining, based on the location information and the location-tagged RF ranging assistance data, whether a first portion of the second RF ranging data is associated with the static object type or the temporary-static object type.

Aspect 20. The method of aspect 19, wherein the first imaging data comprises digital camera image data, light detection and ranging (LIDAR) data, or both.

Aspect 21. The method of any of aspects 19-20, further comprising: receiving, from the RF ranging assistance server, a signal requesting the UE to refrain from transmitting RF ranging data to the RF ranging assistance server.

Aspect 22. The method of any of aspects 19-21, further comprising: determining, based on the second RF ranging data and heading information of the UE, a local RF ranging signature; and determining, based on the local RF ranging signature and the RF ranging assistance data, a global location of the UE.

Aspect 23. The method of any of aspects 19-22, further comprising: transmitting, to the RF ranging assistance server, the second RF ranging data.

Aspect 24. The method of aspect 23, wherein the transmitting the second RF ranging data is based on a confidence level associated with the second RF ranging data.

Aspect 25. The method of aspect 24, further comprising: comparing the second RF ranging data to the RF ranging assistance data; and determining, based on the comparing, the confidence level of the second RF ranging data.

Aspect 26. The method of any of aspects 19-25, wherein the determining whether the first portion of the second RF ranging data is the static object type or the temporary-static object type comprises comparing the first portion of the second RF ranging data to a corresponding second portion of the RF ranging assistance data.

Aspect 27. The method of any of aspects 19-26, further comprising: obtaining second imaging data associated with the first portion of the second RF ranging data; and verifying, based on the second imaging data, whether the first portion of the second RF ranging data is the static object type or the temporary-static object type.

Aspect 28. The method of any of aspects 19-27, further comprising: receiving, from the RF ranging assistance server, map data; determining, based on the map data, a route of travel; and updating, based on the second RF ranging data and the RF ranging assistance data, the route of travel.

Aspect 29. The method of any of aspects 19-28, wherein the UE is coupled to a motor vehicle, wherein the second RF ranging data comprises a second portion associated with a location of an object in a field of view, and wherein the method further comprises: obtaining second imaging data associated with the location of the object in the field of view; and determining, based on a comparison of the second portion of the RF ranging data and the second imaging data, whether to adjust a heading of the motor vehicle to avoid the location of the object in the field of view.

Aspect 30. A method performed by a radio frequency (RF) assistance server, the method comprising: receiving, from a plurality of user equipments (UEs), location-tagged RF ranging data; determining, based on the location-tagged RF ranging data, semantic information indicating a first portion of the RF ranging data is associated with a static object type and a second portion of the RF ranging data is associated with a temporary-static object type different from the static object type; and transmitting, to one or more of the plurality of UEs, RF ranging assistance data tagged with the semantic information.

Aspect 31. The method of aspect 30, wherein each of the one or more of the plurality of UEs is associated with a motor vehicle, and wherein the receiving the location-tagged RF ranging data comprises receiving the location-tagged RF ranging data from the plurality of UEs via a wireless wide area network (WWAN).

Aspect 32. The method of any of aspects 30-31, wherein each of the one or more of the plurality of UEs is associated with a motor vehicle, and wherein the receiving the location-tagged RF ranging data comprises receiving the location-tagged RF ranging data via a wireless local area network (WLAN) in response to the UE connecting to the WLAN.

Aspect 33. The method of any of aspects 30-32, further comprising: receiving, from the plurality of UEs, imaging data, wherein the RF ranging assistance data is further based on the imaging data.

Aspect 34. The method of any of aspects 30-33, wherein the semantic information indicates a first portion of the RF ranging assistance data is associated with the static object type and a second portion of the RF ranging assistance data is associated with the temporary-static object type.

Aspect 35. The method of any of aspects 30-34, further comprising: transmitting, to the plurality of UEs, a signal requesting the plurality of UEs to transmit the first RF ranging data tagged with the semantic information.

Aspect 36. The method of any of aspects 30-35, further comprising receiving, from the plurality of UEs, pose and velocity information associated with the RF ranging data.

Aspect 37. The method of any of aspects 30-36, further comprising: determining, using machine learning and based on the first RF ranging data, the semantic information.

Aspect 38. The method of any of aspects 30-37, further comprising: identifying, based on the location-tagged RF ranging data, a navigational boundary, wherein the semantic information comprises an indication of a location of the navigational boundary.

Aspect 39. A user equipment (UE) comprising: a memory device; a transceiver, and a processor in communication with the memory device and the transceiver, wherein the UE is configured to perform the steps of any of aspects 1-18.

Aspect 40. A user equipment (UE) comprising: a memory device; a transceiver, and a processor in communication with the memory device and the transceiver, wherein the UE is configured to perform the steps of any of aspects 19-29.

Aspect 41. An apparatus, comprising: a memory device; a transceiver, and a processor in communication with the memory device and the transceiver, wherein the UE is configured to perform the steps of any of aspects 30-38.

Aspect 42. A non-transitory, computer-readable medium having program code recorded thereon, wherein the program code comprises instructions executable by a processor of a user equipment (UE) to cause the UE to perform the steps of any of aspects 1-18.

Aspect 43. A non-transitory, computer-readable medium having program code recorded thereon, wherein the program code comprises instructions executable by a processor of a user equipment (UE) to cause the UE to perform the steps of any of aspects 19-29.

Aspect 44. A non-transitory, computer-readable medium having program code recorded thereon, wherein the program code comprises instructions executable by a processor of an apparatus to cause the apparatus to perform the steps of any of aspects 30-38.

Aspect 45. A user equipment (UE) comprising means for performing the steps of any of aspects 1-18.

Aspect 46. A user equipment (UE) comprising means for performing the steps of any of aspects 19-29.

Aspect 47. An apparatus, comprising means for performing the steps of any of aspects 30-38.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method performed by a user equipment (UE), the method comprising:
    obtaining sensor data comprising first radio frequency (RF) ranging data and imaging data;
    tagging the first RF ranging data with location information and semantic information, wherein the semantic information is based on the imaging data, and wherein the semantic information indicates a first portion of the RF ranging data is associated with a static object type and a second portion of the RF ranging data is associated with a temporary-static object type different from the static object type; and
    transmitting, to a RF ranging assistance server, the first RF ranging data tagged with the location information and the semantic information.

2. The method of claim 1, wherein the RF ranging data comprises radio detection and ranging (RADAR) data, fifth-generation (5G) signal data, WiFi signal data, ultra-wide-band (UWB) signal data, or a combination thereof.

3. The method of claim 1, wherein the imaging data comprises digital camera image data, light detection and ranging (LIDAR) data, or both.

4. The method of claim 1, wherein UE is associated with a motor vehicle, and wherein the transmitting the first RF ranging data comprises transmitting the first RF ranging data via a wide area network (WAN) while the motor vehicle is in motion.

5. The method of claim 1, wherein the UE is associated with a motor vehicle, wherein the method further comprises:
    storing, on a memory device of the motor vehicle, the first RF ranging data tagged with the location information and the semantic information, and
    wherein the transmitting the first RF ranging data comprises transmitting the first RF ranging data via a local area network (LAN) in response to the UE connecting to the LAN.

6. The method of claim 1, further comprising:
    receiving, from the RF ranging assistance server, location-tagged RF ranging assistance data based on second RF ranging data, the second RF ranging data being from a plurality of other UEs different from the UE.

7. The method of claim 6, wherein the location-tagged RF ranging assistance data is further based on imaging data from the plurality of other UEs.

8. The method of claim 6, wherein the location-tagged RF ranging assistance data indicates a first portion of the location-tagged RF ranging assistance data is associated with the static object type and a second portion of the RF ranging assistance data is associated with the temporary-static object type.

9. The method of claim 6, further comprising:
storing, in a memory device of the UE, the location-tagged RF ranging assistance data.

10. The method of claim 9, further comprising:
storing, in the memory device, data indicating the first portion of the location-tagged RF ranging assistance data is associated with the static object type.

11. The method of claim 6, further comprising:
receiving, from the RF ranging assistance server, updated location-tagged RF ranging assistance data based on the location-tagged RF ranging assistance data, the first RF ranging data, and the semantic information.

12. The method of claim 1, further comprising:
receiving, from the RF ranging assistance server, a signal requesting the UE to transmit the first RF ranging data tagged with the semantic information,
wherein the transmitting the first RF ranging data is based on the receiving the signal.

13. The method of claim 1,
wherein the transmitting the first RF ranging data is based on a confidence level of the sensor data.

14. The method of claim 1, further comprising:
tagging the first RF ranging data with data quality information, wherein the transmitting the first RF ranging data comprises transmitting the first RF ranging data tagged with the data quality information.

15. The method of claim 1, wherein the sensor data further comprises pose and velocity information associated with the UE.

16. The method of claim 1, wherein the tagging the first RF ranging data comprises tagging the first RF ranging data with a timestamp.

17. The method of claim 1, further comprising:
determining, using machine learning and based on the first RF ranging data, the semantic information.

18. The method of claim 1, further comprising:
identifying, based on the first RF ranging data, a navigational boundary, wherein the semantic information comprises an indication of a location of the navigational boundary.

19. A method performed by a user equipment (UE), the method comprising:
transmitting, to a radio frequency (RF) ranging assistance server, location information associated with a position of the UE;
receiving, from a RF ranging assistance server based on the location information, location-tagged RF ranging assistance data based on first RF ranging data and first imaging data from a plurality of other UEs different from the UE, wherein the location-tagged RF ranging assistance data comprises semantic information indicating a first portion of the location-tagged RF ranging assistance data is associated with a static object type, and a second portion of the location-tagged RF ranging assistance data is associated with a temporary-static object type;
obtaining second RF ranging data; and
determining, based on the location information and the location-tagged RF ranging assistance data, whether a first portion of the second RF ranging data is associated with the static object type or the temporary-static object type.

20. The method of claim 19, wherein the first imaging data comprises digital camera image data, light detection and ranging (LIDAR) data, or both.

21. The method of claim 19, further comprising:
receiving, from the RF ranging assistance server, a signal requesting the UE to refrain from transmitting RF ranging data to the RF ranging assistance server.

22. The method of claim 19, further comprising:
determining, based on the second RF ranging data and heading information of the UE, a local RF ranging signature; and
determining, based on the local RF ranging signature and the RF ranging assistance data, a global location of the UE.

23. The method of claim 19, further comprising:
transmitting, to the RF ranging assistance server, the second RF ranging data.

24. The method of claim 23, wherein the transmitting the second RF ranging data is based on a confidence level associated with the second RF ranging data.

25. The method of claim 24, further comprising:
comparing the second RF ranging data to the RF ranging assistance data; and
determining, based on the comparing, the confidence level of the second RF ranging data.

26. The method of claim 19, wherein the determining whether the first portion of the second RF ranging data is the static object type or the temporary-static object type comprises comparing the first portion of the second RF ranging data to a corresponding second portion of the RF ranging assistance data.

27. The method of claim 19, further comprising:
obtaining second imaging data associated with the first portion of the second RF ranging data; and
verifying, based on the second imaging data, whether the first portion of the second RF ranging data is the static object type or the temporary-static object type.

28. The method of claim 19, further comprising:
receiving, from the RF ranging assistance server, map data;
determining, based on the map data, a route of travel; and
updating, based on the second RF ranging data and the RF ranging assistance data, the route of travel.

29. The method of claim 19, wherein the UE is coupled to a motor vehicle, wherein the second RF ranging data comprises a second portion associated with a location of an object in a field of view, and wherein the method further comprises:
obtaining second imaging data associated with the location of the object in the field of view; and
determining, based on a comparison of the second portion of the RF ranging data and the second imaging data, whether to adjust a heading of the motor vehicle to avoid the location of the object in the field of view.

30. A user equipment (UE), comprising:
a memory device;
a transceiver; and
a processor in communication with the memory device, wherein the UE is configured to:
obtain sensor data comprising first radio frequency (RF) ranging data and imaging data;

tag the first RF ranging data with location information and semantic information, wherein the semantic information is based on the imaging data, and wherein the semantic information indicates a first portion of the RF ranging data is associated with a static object type and a second portion of the RF ranging data is associated with a temporary-static object type different from the static object type; and transmit, to a RF ranging assistance server, the first RF ranging data tagged with the location information and the semantic information.

31. The UE of claim 30, wherein UE is associated with a motor vehicle, and wherein the UE configured to transmit the first RF ranging data comprises the UE configured to transmit the first RF ranging data via a wide area network (WAN) while the motor vehicle is in motion.

32. The UE of claim 30, wherein the UE is associated with a motor vehicle, wherein the UE is further configured to:
store, on a memory device of the motor vehicle, the first RF ranging data tagged with the location information and the semantic information, and
wherein the UE configured to transmit the first RF ranging data comprises the UE configured to transmit the first RF ranging data via a local area network (LAN) in response to the UE connecting to the LAN.

33. The UE of claim 30, wherein the UE is further configured to:
receive, from the RF ranging assistance server, location-tagged RF ranging assistance data based on second RF ranging data, the second RF ranging data being from a plurality of other UEs different from the UE.

34. The UE of claim 33, wherein the location-tagged RF ranging assistance data is further based on imaging data from the plurality of other UEs.

35. The UE of claim 33, wherein the location-tagged RF ranging assistance data indicates a first portion of the location-tagged RF ranging assistance data is associated with the static object type and a second portion of the RF ranging assistance data is associated with the temporary-static object type.

36. The UE of claim 33, wherein the UE is further configured to:
store, in a memory device of the UE, the location-tagged RF ranging assistance data; and:
store, in the memory device, data indicating the first portion of the location-tagged RF ranging assistance data is associated with the static object type.

37. The UE of claim 33, wherein the UE is further configured to:
receive, from the RF ranging assistance server, updated location-tagged RF ranging assistance data based on the location-tagged RF ranging assistance data, the first RF ranging data, and the semantic information.

38. The UE of claim 30, wherein the UE is further configured to:
receive, from the RF ranging assistance server, a signal requesting the UE to transmit the first RF ranging data tagged with the semantic information,
wherein the UE configured to transmit the first RF ranging data is based on the signal.

39. The UE of claim 30, wherein the UE configured to transmit the first RF ranging data is based on a confidence level of the sensor data.

40. The UE of claim 30, wherein the UE is further configured to:
tag the first RF ranging data with data quality information, wherein the UE configured to transmit the first RF ranging data comprises the UE configured to transmit the first RF ranging data tagged with the data quality information.

41. The UE of claim 30, wherein the sensor data further comprises pose and velocity information associated with the UE.

42. The UE of claim 30, wherein the UE is further configured to:
determine, using machine learning and based on the first RF ranging data, the semantic information.

43. The UE of claim 30, wherein the UE is further configured to:
identify, based on the first RF ranging data, a navigational boundary, wherein the semantic information comprises an indication of a location of the navigational boundary.

44. A user equipment (UE), comprising:
a memory device;
a transceiver; and
a processor in communication with the memory device, wherein the UE is configured to:
transmit, to a radio frequency (RF) ranging assistance server, location information associated with a position of the UE;
receive, from a RF ranging assistance server based on the location information, location-tagged RF ranging assistance data based on first RF ranging data and first imaging data from a plurality of other UEs different from the UE, wherein the location-tagged RF ranging assistance data comprises semantic information indicating a first portion of the location-tagged RF ranging assistance data is associated with a static object type, and a second portion of the location-tagged RF ranging assistance data is associated with a temporary-static object type;
obtain second RF ranging data; and
determine, based on the location information and the location-tagged RF ranging assistance data, whether a first portion of the second RF ranging data is associated with the static object type or the temporary-static object type.

45. The UE of claim 44, wherein the UE is further configured to:
receive, from the RF ranging assistance server, a signal requesting the UE to refrain from transmit RF ranging data to the RF ranging assistance server.

46. The UE of claim 44, wherein the UE is further configured to:
determine, based on the second RF ranging data and heading information of the UE, a local RF ranging signature; and
determine, based on the local RF ranging signature and the RF ranging assistance data, a global location of the UE.

47. The UE of claim 44, wherein the UE is further configured to:
transmit, to the RF ranging assistance server, the second RF ranging data based on a confidence level associated with the second RF ranging data.

48. The UE of claim 47, wherein the UE is further configured to:
compare the second RF ranging data to the RF ranging assistance data; and
determine, based on the compare, the confidence level of the second RF ranging data.

49. The UE of claim 44, wherein the UE configured to determine whether the first portion of the second RF ranging data is the static object type or the temporary-static object type comprises the UE configured to compare the first portion of the second RF ranging data to a corresponding second portion of the RF ranging assistance data.

50. A non-transitory, computer-readable medium having program code recorded thereon, wherein the program code comprises instructions executable by a processor of a user equipment (UE) to cause the UE to:
- obtain sensor data comprising first radio frequency (RF) ranging data and imaging data;
- tag the first RF ranging data with location information and semantic information, wherein the semantic information is based on the imaging data, and wherein the semantic information indicates a first portion of the RF ranging data is associated with a static object type and a second portion of the RF ranging data is associated with a temporary-static object type different from the static object type; and
- transmit, to a RF ranging assistance server, the first RF ranging data tagged with the location information and the semantic information.

* * * * *